US007007291B2

(12) United States Patent
Saji et al.

(10) Patent No.: US 7,007,291 B2
(45) Date of Patent: Feb. 28, 2006

(54) DISC CARTRIDGE

(75) Inventors: Yoshito Saji, Nishinomiya (JP);
Hironori Okazawa, Katano (JP);
Kuniko Nakata, Neyagawa (JP);
Teruyuki Takizawa, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/469,062

(22) PCT Filed: Feb. 4, 2003

(86) PCT No.: PCT/JP03/01142

§ 371 (c)(1),
(2), (4) Date: Aug. 26, 2003

(87) PCT Pub. No.: WO03/069620

PCT Pub. Date: Aug. 21, 2003

(65) Prior Publication Data

US 2004/0205809 A1    Oct. 14, 2004

(30) Foreign Application Priority Data

Feb. 15, 2002    (JP)    ............................. 2002-038086

(51) Int. Cl.
*G11B 23/03* (2006.01)
(52) U.S. Cl. .................................................. 720/725
(58) Field of Classification Search ................ 720/718, 720/725, 726, 728, 732, 738–744
See application file for complete search history.

(56) References Cited

U.S. PATENT DOCUMENTS

| 4,773,061 A | 9/1988 | Stark et al. |
| 4,829,504 A | 5/1989 | Sunaga et al. |
| 4,862,448 A | 8/1989 | Tanaka et al. |
| 5,499,233 A | 3/1996 | Childers et al. |
| 6,172,962 B1 | 1/2001 | Goto et al. |
| 6,274,844 B1 * | 8/2001 | Beuch et al. ........... 219/121.64 |
| 6,339,583 B1 | 1/2002 | Watanabe et al. |
| 6,356,527 B1 * | 3/2002 | Shiomi et al. ............... 720/738 |

(Continued)

FOREIGN PATENT DOCUMENTS

EP    0 366 452 A2    5/1990

(Continued)

*Primary Examiner*—William Korzuch
(74) *Attorney, Agent, or Firm*—Akin Gump Strauss Hauer & Feld, LLP

(57) ABSTRACT

A disc cartridge the present invention includes a cartridge body and first and second shutters. The cartridge body includes a disc storage portion, a chucking opening and a head opening. The disc storage portion has a disc window and a bottom and stores a disc, having first and second sides, therein so that the disc is rotatable in the disc storage portion and that the first side of the disc is exposed inside the disc window. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The first and second shutters are provided between the second side of the disc and the bottom of the disc storage portion. The first shutter rotates around the center of the chucking opening. The center of rotation of the second shutter is located outside of the chucking opening. And the first and second shutters expose or cover the head opening cooperatively.

21 Claims, 16 Drawing Sheets

U.S. PATENT DOCUMENTS

| | | |
|---|---|---|
| 6,473,392 B1 * | 10/2002 | Shiomi et al. ............... 720/738 |
| 6,816,340 B1 * | 11/2004 | Oishi et al. ................. 360/133 |
| 2001/0055270 A1 * | 12/2001 | Obata et al. ................. 369/291 |
| 2002/0031080 A1 * | 3/2002 | Inoue ......................... 369/291 |
| 2002/0071375 A1 | 6/2002 | Takahashi et al. |
| 2003/0053409 A1 | 3/2003 | Okazawa et al. |
| 2003/0112738 A1 * | 6/2003 | Takizawa et al. ........... 369/291 |
| 2003/0112739 A1 | 6/2003 | Takizawa et al. |
| 2003/0112740 A1 | 6/2003 | Takizawa et al. |
| 2003/0112741 A1 | 6/2003 | Takizawa et al. |
| 2003/0117939 A1 | 6/2003 | Takizawa et al. |

FOREIGN PATENT DOCUMENTS

| | | |
|---|---|---|
| EP | 0 866 458 A1 | 9/1998 |
| EP | 0 973 163 A2 | 1/2000 |
| EP | 1 274 082 A2 | 1/2003 |
| GB | 2 326 515 A | 12/1998 |
| JP | 61104381 A | 5/1986 |
| JP | 04-067486 A | 3/1992 |
| JP | 7-10860 | 2/1995 |
| JP | 09-153264 A | 6/1997 |
| JP | 10031856 A | 2/1998 |
| JP | 11-238335 A | 8/1999 |
| JP | 11339424 A | 12/1999 |
| JP | 2000-048520 A | 2/2000 |
| JP | 2000-090628 A | 3/2000 |
| JP | 2000113630 A | 4/2000 |
| JP | 2001-283558 A | 10/2001 |
| WO | WO 99/26242 A1 | 5/1999 |

* cited by examiner

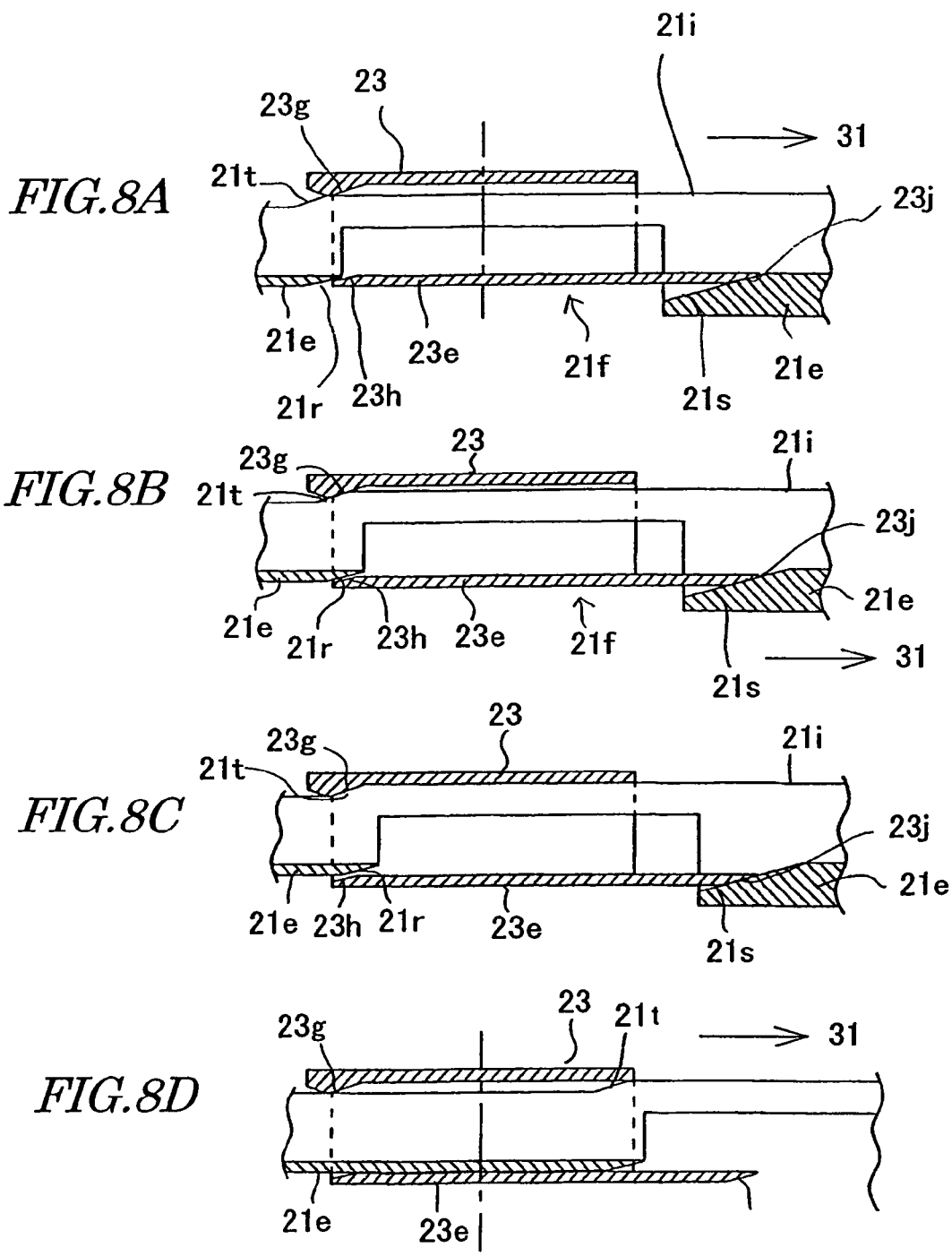

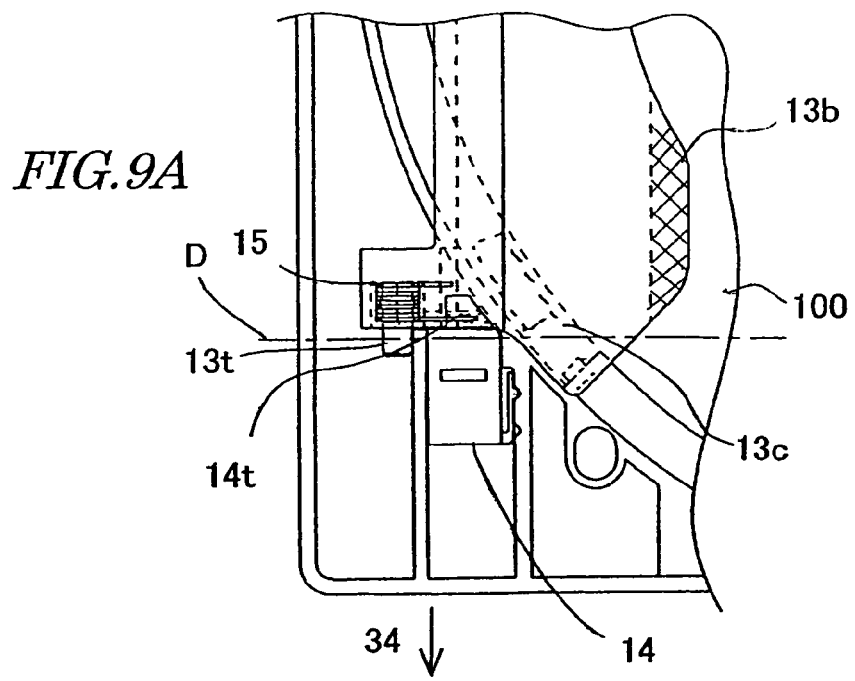
FIG.9A
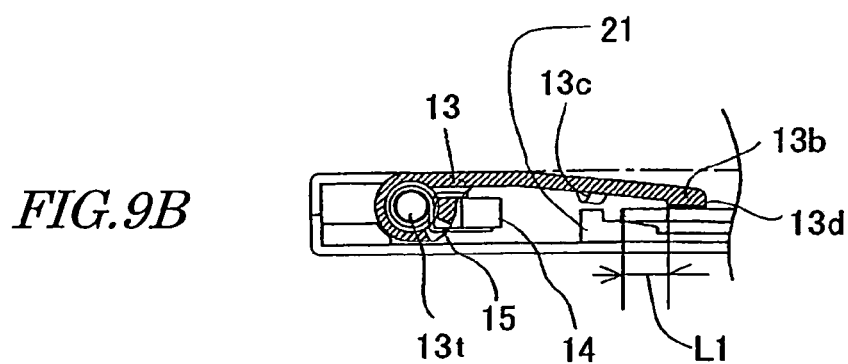
FIG.9B
FIG.9C
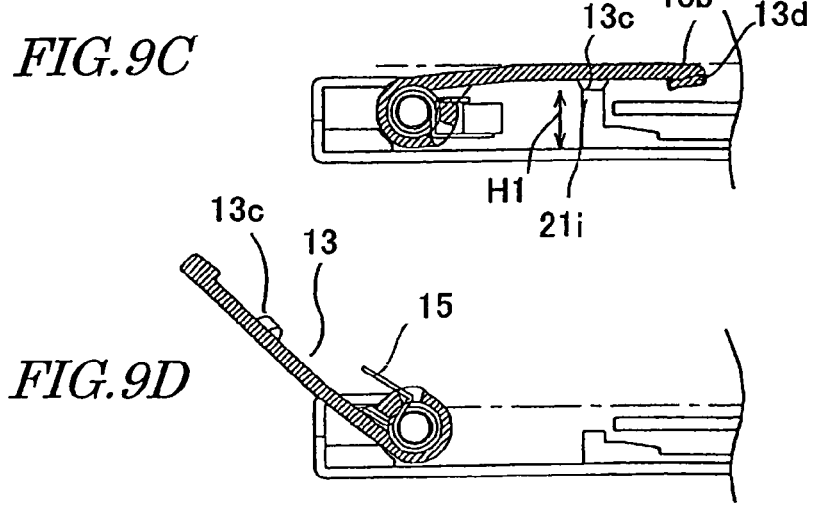
FIG.9D

DISC CARTRIDGE

CROSS-REFERENCE TO RELATED APPLICATION

This application is a Section 371 of International Application No. PCT/JP03/01142, filed Feb. 4, 2003, the disclosure of which is incorporated herein by reference.

TECHNICAL FIELD

The present invention relates to a disc cartridge for use to store a disk storage medium such as an optical disc or a magnetic disk therein in a rotatable state.

BACKGROUND ART

Various disc cartridges have been proposed as protective cases for disc storage media.

For example, Japanese Laid-Open Patent Publication No. 9-153264 discloses a disc cartridge in which a disk storage medium having a single or double signal recording sides (which will be herein referred to as a "disc" simply) is completely enclosed in a disc storage portion. The disc storage portion is defined inside a cartridge body that is made up of upper and lower halves. The cartridge body includes chucking openings and a head opening. The chucking openings allow the turntable of a spindle motor and a clamper to chuck a disc inserted, while the head opening allows a read/write head to read and/or write a signal from/on the disc. The lower one of the chucking openings is continuous with the head opening. Accordingly, while the user carries such a cartridge, dust easily enters the inside of the cartridge through these openings and the disc is also easily soiled with finger marks. For that reason, the disc cartridge further includes a shutter for closing these openings up.

A disc cartridge having such a structure, however, has the following drawbacks. Firstly, such a disc cartridge cannot be so thin. This is because the disc storage space, defined between the upper and lower halves, should be thick enough to allow a disc drive to accurately read or write a signal (or information) from/onto the disc stored in such a disc cartridge. The reasons why the disc storage space should be relatively thick include the expected flutter or warp of the disc being rotated and an error that may occur in disposing the disc cartridge at a predetermined position inside the disc drive.

Secondly, the shutter for closing up these chucking and head openings at the same time cannot be formed at a low cost, thus increasing the overall manufacturing cost of such a disc cartridge. The reason is as follows. Specifically, the lower half of the disc cartridge is provided with a chucking opening for the turntable of the spindle motor and a head opening, while the upper half thereof is provided with another chucking opening for the clamper. Thus, to close these three openings up at a time, the shutter needs to be formed in a U-shape, which is not so cheap to make.

Thirdly, the disc stored inside such a disc cartridge is not fixed in many cases, thus possibly causing dust or fine particle deposition and scratching problems. Specifically, although a disc with a metal hub can be attracted and fixed in position via a magnetic force so as not to move inconstantly, an optical disc with no hub, e.g., a CD or a DVD, is normally not fixed, and movable freely, inside the disc cartridge. Accordingly, when the shutter of the disc cartridge is opened inside the disc drive, dust may enter the cartridge through its openings and be deposited on the disc easily. Also, if the disc is shaken so much as to contact with the inner walls of the disc cartridge, the signal recording side of the disc may get scratched or fine particles may be stirred up and deposited on the disc.

DISCLOSURE OF INVENTION

In order to overcome the problems described above, an object of the present invention is to provide a disc cartridge that has a reduced thickness and a simplified, much less expensive shutter for a single-sided disc, in particular.

Another object of the present invention is to provide a disc cartridge that can drastically reduce the dust to be deposited on the disc stored therein by getting the disc firmly held inside the disc cartridge and eliminating the inconstant movement of the disc.

A third object of the present invention is to provide a disc cartridge of a good design by displaying the label side of the disc stored therein.

A disc cartridge according to a preferred embodiment of the present invention includes a cartridge body and first and second shutters. The cartridge body includes a disc storage portion, a chucking opening and a head opening. The disc storage portion has a disc window and a bottom and stores a disc, having first and second sides, therein so that the disc is rotatable in the disc storage portion and that the first side of the disc is exposed inside the disc window. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The first and second shutters are provided between the second side of the disc and the bottom of the disc storage portion. The first shutter rotates around the center of the chucking opening. The center of rotation of the second shutter is located outside of the chucking opening. And the first and second shutters expose or cover the head opening cooperatively.

In one preferred embodiment of the present invention, the first and second shutters are preferably located on substantially the same plane.

In another preferred embodiment of the present invention, the first and second shutters preferably have first and second pairs of contact portions. The contact portions of each of the first and second pairs preferably contact with each other while the first and second shutters are closed. A line that connects one end of the second pair of contact portions, which end is located near the chucking opening, to the center of rotation of the second shutter preferably defines an obtuse angle with the second pair of contact portions.

In still another preferred embodiment, the center of rotation of the second shutter is preferably located outside of the disc storage portion.

In yet another preferred embodiment, the first and second shutters are preferably interlocked with each other.

In yet another preferred embodiment, the first shutter preferably includes a protrusion that protrudes toward the bottom of the disc storage portion, while the second shutter preferably includes a groove that engages with the protrusion of the first shutter.

In yet another preferred embodiment, while closed, the first and second shutters preferably define a continuous center hole that has a diameter approximately equal to that of the chucking opening.

In yet another preferred embodiment, each of the first and second shutters preferably includes a first convex portion. The first convex portions preferably contact with each other to form a continuous ring-like convex portion around the center hole while the first and second shutters are closed.

In this particular preferred embodiment, the first shutter preferably further includes a second convex portion that contacts with an outer edge and its surrounding portion of the second side of the disc.

In that case, the top of the first convex portions of the first and second shutters is preferably substantially as high as that of the second convex portion of the first shutter.

In yet another preferred embodiment, the cartridge body preferably includes a positioning hole for use to define a position at which the disc cartridge is fitted with a disc drive, and the center of rotation of the second shutter is preferably a boss that defines the positioning hole inside.

In yet another preferred embodiment, the center of rotation of the second shutter is preferably located on the bottom of the disc storage portion.

In yet another preferred embodiment, the disc cartridge preferably further includes first and second disc holders for pressing the disc toward the bottom of the disc storage portion and holding the disc thereon inside the disc storage portion while the first and second shutters are closed.

In this particular preferred embodiment, each of the first and second disc holders preferably includes a downwardly tapered slope and preferably holds the disc thereon by bringing the slope into contact with the outer edge of the disc.

Specifically, the first disc holder is preferably provided for the second shutter.

In yet another preferred embodiment, while the first and second shutters closed are going to be opened, the top of the second convex portion of the first shutter is preferably locally higher than that of the first convex portion of the second shutter.

In yet another preferred embodiment, the tops of the first and second convex portions of the first shutter are preferably located on the same plane, which is not parallel to the bottom of the disc storage portion.

In yet another preferred embodiment, the first and second shutters are preferably located on two mutually different planes.

In that case, the bottom of the first shutter may be parallel to the bottom of the disc storage portion.

Alternatively, the bottom of the second shutter may be parallel to the bottom of the disc storage portion.

A disc cartridge according to another preferred embodiment of the present invention includes a cartridge body, at least one shutter and a disc supporting member. The cartridge body includes a disc storage portion, a chucking opening and a head opening. The disc storage portion has a disc window and a bottom and stores a disc, having first and second sides, therein so that the disc is rotatable in the disc storage portion and that the first side of the disc is exposed inside the disc window. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The at least one shutter is provided between the second side of the disc and the bottom of the disc storage portion so as to expose or cover the head opening. The disc supporting member contacts with an outer edge and its surrounding portion of the second side of the disc while the head opening is covered with the shutter.

In one preferred embodiment of the present invention, the disc supporting member is preferably movable upward and downward with respect to the bottom of the disc storage portion so as to avoid contact with the outer edge and the surrounding portion of the second side of the disc while the shutter is opened.

In another preferred embodiment of the present invention, the shutter preferably includes: a cylindrical sidewall; and a bottom connected to the cylindrical sidewall. The disc supporting member is preferably moved up or down by the sidewall.

In still another preferred embodiment, while the shutter is opened, the disc supporting member is preferably located between the bottom of the shutter and the bottom of the disc storage portion.

In yet another preferred embodiment, while the shutter is closed, the disc supporting member is preferably located between the shutter and the disc.

In yet another preferred embodiment, the disc supporting member is preferably secured to the cartridge body.

A disc cartridge according to yet another preferred embodiment of the present invention includes a cartridge body, at least one shutter and a disc retaining member. The cartridge body includes a disc storage portion, a chucking opening and a head opening. The disc storage portion has a disc window and a bottom and stores a disc, having first and second sides, therein so that the disc is rotatable in the disc storage portion and that the first side of the disc is exposed inside the disc window. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The at least one shutter is provided between the second side of the disc and the bottom of the disc storage portion so as to expose or cover the head opening. The disc retaining member protrudes into the disc window and contacts with the first side of the disc so as to press the disc toward the bottom of the disc storage portion in a region that is separated from an outer edge of the disc via a predetermined distance.

In one preferred embodiment of the present invention, the disc retaining member preferably protrudes into the disc window so as not to contact with the disc while the shutter is opened.

In another preferred embodiment of the present invention, the disc retaining member is preferably secured to the cartridge body so as to be rotatable to a position where the disc retaining member does not protrude into the disc window.

In this particular preferred embodiment, the disc cartridge preferably further includes a locking member for use to prevent the disc retaining member from rotating to the position where the disc retaining member does not protrude into the disc window.

In yet another preferred embodiment, the disc retaining member preferably has first and second regions that contact with the disc.

In this particular preferred embodiment, the disc retaining member preferably includes rotation stoppers, which are used to prevent the disc from rotating, in the first and second regions.

Specifically, the rotation stoppers are preferably made of rubber.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIGS. 8A through 8D are cross-sectional views illustrating how the disc supporting member operates.

FIG. 9A is a plan view of a disc retaining member of the disc cartridge shown in FIG. 1.

FIGS. 9B, 9C and 9D are cross-sectional views of the disc retaining member taken along the line D shown in FIG. 9A.

BEST MODE FOR CARRYING OUT THE INVENTION

First Embodiment

Hereinafter, a disc cartridge 1 according to a first specific preferred embodiment of the present invention will be described with reference to the accompanying drawings.

Figure 1:
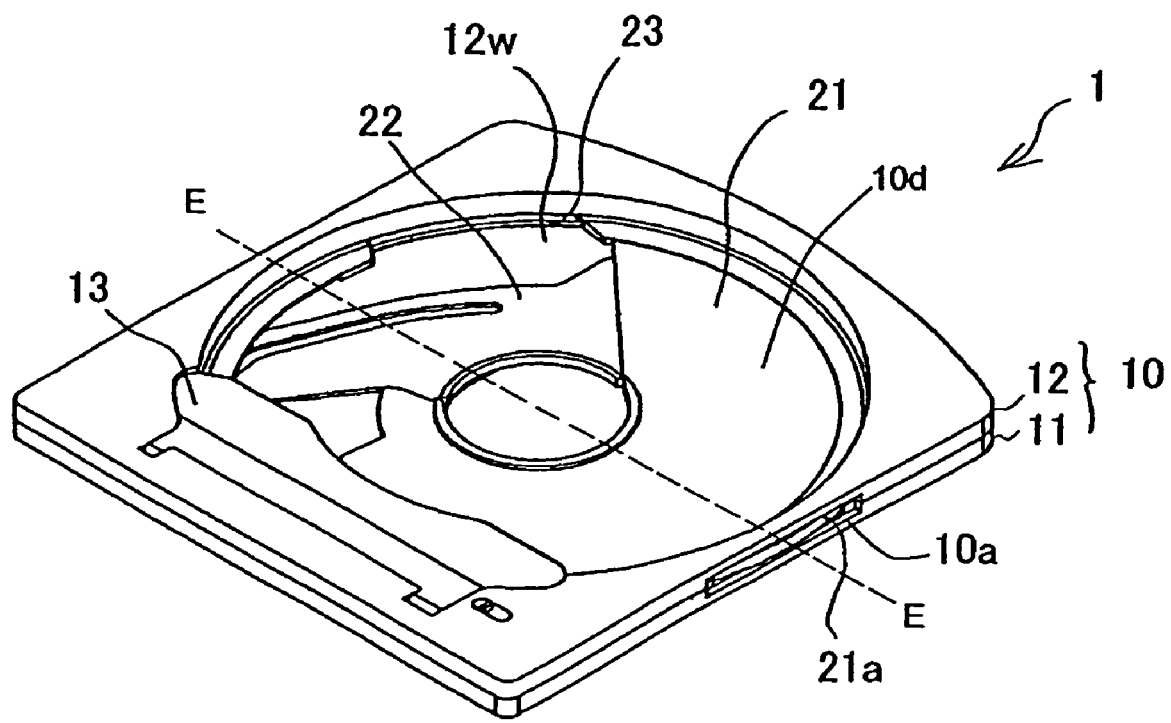
FIG. 1 is a perspective view illustrating a disc cartridge according to a first specific preferred embodiment of the present invention.
Figure 2:
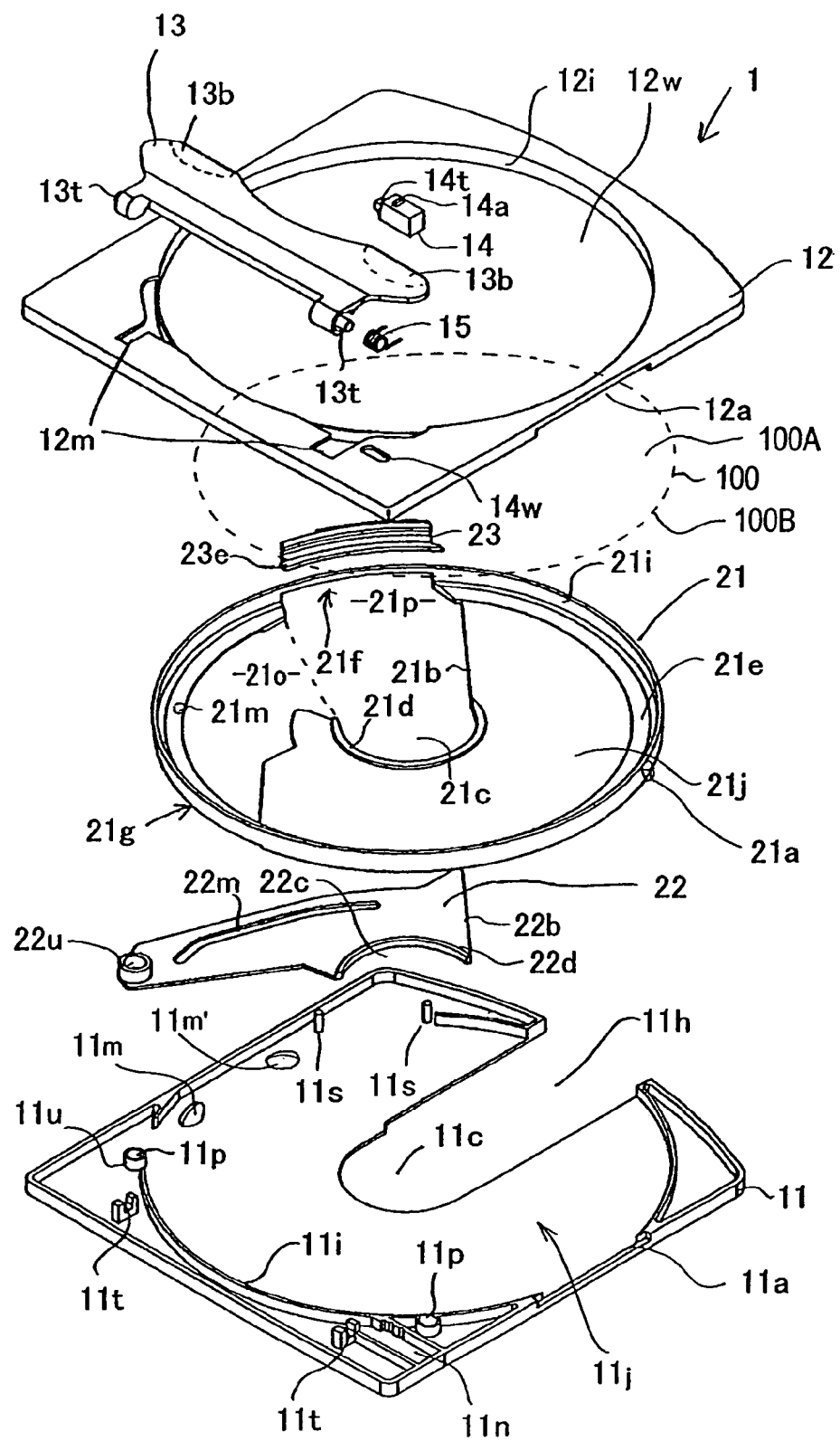
FIG. 2 is an exploded perspective view of the disc cartridge shown in FIG. 1.

First, the structure of the disc cartridge 1 will be outlined with reference to FIGS. 1 and 2. The disc cartridge 1 includes lower shell 11, upper shell 12, first shutter 21, second shutter 22, disc supporting member 23 and disc retaining member 13. The lower and upper shells 11 and 12, first and second shutters 21 and 22, disc supporting member 23 and disc retaining member 13 are preferably made of a synthetic resin, for example. However, these members do not all have to be made of the same material but best materials may be selected for the respective members in view of the mechanical strengths and appearance required for these members.

As shown in FIG. 2, the cartridge body 10, made up of the upper and lower shells 12 and 11, has an inner lower surface 11j. The inner lower surface 11j includes a chucking opening 11c and a head opening 11h. The chucking opening 11c allows a chucking member (e.g., a spindle motor for rotating the disc 100) to enter the disc cartridge 1 externally. The head opening 11h allows a head, which reads and/or writes a signal (or information) from/on the disc 100, to enter the disc cartridge 1 and access a target location on the disc 100. The head opening 11h is continuous with the chucking opening 11c. On the inner lower surface 11j, two positioning holes 11p, which engage with cartridge positioning pins of a disc drive (not shown), are formed. These positioning holes 11p are defined inside bosses 11u. Also, a pair of guide pins 11s for moving the disc supporting member 23 up and down with respect to the inner lower surface 11j is provided on the inner lower surface 11j. Furthermore, a pair of bearings 11t is provided on the inner lower surface 11j to mount the disc retaining member 13 thereon in a rotatable state.

The upper shell 12 includes a circular disc window 12w, through which the disc 100 can be introduced and removed into/from the disc cartridge 1 and which expands over the entire projection area of the disc 100. The disc window 12w is defined by a cylindrical inner side surface 12i. The upper shell 12 has notches 12m for receiving the disc retaining member 13.

The upper and lower shells 12 and 11 are adhered or welded together at their outer periphery or joined together via some connecting members (e.g., screws), thereby forming the cartridge body 10. The inner lower surface 11j and the inner side surface 12i of the cartridge body 10 define a disc storage portion 10d in which the disc 100 is supposed to be stored. Also, the lower and upper shells 11 and 12 are provided with notches 11a and 12a, respectively, which define the opening 10a of the cartridge body 10 as shown in FIG. 1. However, the opening 10a does not have to be located at the position illustrated in FIG. 1, but may be provided for a side surface that is opposed to the side surface including the opening 10a, a side surface that is adjacent to the side surface including the opening 10a or two or more of these side surfaces.

In the disc storage portion 10d, the space defined by the inner side surface 12i is wide enough to allow the disc 100 to rotate therein without contacting with the inner side surface 12i. The top of the disc storage portion 10d is opened as the disc window 12w, and the first side 100B of the disc 100 stored in the disc storage portion 10d is exposed entirely inside the disc window 12w. On the other hand, the second side, i.e., the signal recording side 100A, of the disc 100 faces the inner lower surface 11j.

By adopting such a structure, the cartridge 1 can be thinner than the conventional cartridge in which both sides of the disc are covered. In addition, the label side of the disc 100 can be displayed inside the disc window 12w and the user can easily check the contents of the disc 100 that were printed on the label side (i.e., the first side) 100B. Moreover, by displaying the design of the label side, the disc cartridge including the disc can also have a good design.

The first and second shutters 21 and 22 are provided on the inner lower surface 11j of the cartridge body 10. While the disc 100 is stored inside the disc cartridge 1, the first and second shutters 21 and 22 are located between the signal recording side (i.e., the second side) 100A of the disc 100 and the inner lower surface 11j. The first and second shutters 21 and 22 cooperatively cover or expose the head openings 11h with respect to the outside. When the first and second shutters 21 and 22 are opened, the second side 100A of the disc 100 is partially exposed inside the head opening 11h.

The first shutter 21 has such shape and size as to surround the outer side surface of the disc 100 stored in this disc cartridge 1. The first shutter 21 includes a cylindrical sidewall 21i and a bottom 21j that has such a shape as to face a portion of the second side 100A of the disc 100. More specifically, the bottom 21j has a partially notched circular plate shape and has its outer circumference joined with the sidewall 21i. The bottom of the sidewall 21i is connected to a disc outer edge supporting portion 21e, which is a convex portion expanding inward along the inner circumference of the sidewall 21i. As will be described later, the bottom 21j is provided so as not to cover an area 21o that overlaps with an area in which the second shutter 22 moves and another area 21p that overlaps with the head opening 11h while the first shutter 21 is opened. A notch 21f is provided in the area 21p for the sidewall 21i and the disc outer edge supporting portion 21e so that the head can access the disc 100 while the first and second shutters 21 and 22 are opened. Another notch 21g is provided in the area 21o for the sidewall 21i so as to allow the second shutter 22 to pass through it. A protrusion 21m that engages with the second shutter 22 protrudes from the bottom of the disc outer edge supporting portion 21e toward the inner lower surface 11j. The first shutter 21 is held inside the space defined by the sidewall 11i of the lower shell 11 or the inner side surface 12i of the upper shell 12 so as to rotate around the center of the chucking opening 11c.

A portion of the sidewall 21i of the first shutter 21 is exposed inside the opening 10a of the cartridge body 10. Also, as will be described in detail later, a protrusion 21a, which engages with a shutter opening/closing mechanism of the disc drive, is provided on the outer side surface of the sidewall 21i. Alternatively, if the shutter opening/closing mechanism has a gear, the protrusion 21a on the outer side surface of the sidewall 21i may be replaced with a gear.

The second shutter 22 includes a hole 22u, which is inserted into the boss 11u provided on the lower shell 11 outside of the disc storage portion. A guide groove 22m is formed through the second shutter 22 to receive the protrusion 21m of the first shutter 21.

The first and second shutters 21 and 22 have notches 21c and 22c, which define a hole corresponding to the chucking opening 11c when the first and second shutters 21 and 22 are closed. These notches 21c and 22c are surrounded with disc inner edge supporting portions 21d and 22d, respectively, which form a ring-like convex portion when the first and second shutters 21 and 22 are closed. When the disc 100 is stored in the disc cartridge 1 having such a structure, dust or dirt that passed through the center hole of the disc 100 should not enter the inside of the disc cartridge 1 but goes out of the cartridge 1.

Figure 7A:
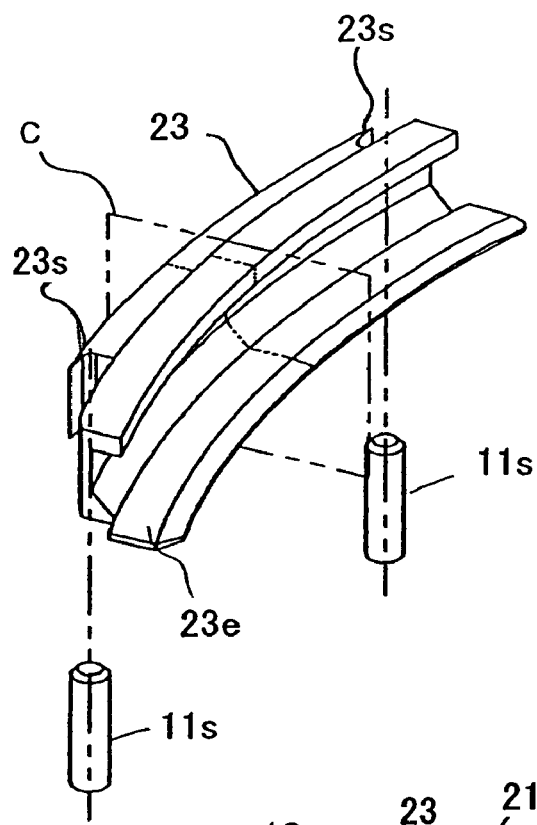
FIG. 7A is a perspective view illustrating a disc supporting member of the disc cartridge shown in FIG. 1.

As shown in FIG. 7A, the disc supporting member 23 has a pair of vertical grooves 23s that engages with the guide pins 11s on the inner lower surface 11j and can move up or down vertically to the inner lower surface 11j (i.e., along the length of the paper). Specifically, while the first and second shutters 21 and 22 are closed, the disc supporting member 23 moves upward to close the notch 21f of the first shutter 21. On the other hand, while the first and second shutters 21 and 22 are opened, the disc supporting member 23 moves downward so as not to interfere with the movement of the first shutter 21.

The disc retaining member 13 includes a pair of shafts 13t, which engages with the bearings 11t of the lower shell 11. A spring 15 is inserted into one of shafts 13t. The spring 15 may be a torsion spring, for example. One end of the spring 15 is fixed by a locking member 14. The disc retaining member 13 protrudes into the disc window 12w of the cartridge body 10 and presses the disc 100 against the first and second shutters 21 and 22 at two contact portions 13b. The number of the contact portions 13b may be three or more. The locking member 14 includes a protrusion 14a to lock or unlock this locking member 14. The protrusion 14a is received by an opening 14w of the upper shell 12.

The disc retaining member 13 is provided near a side surface of the cartridge body 10 that is opposed to the side surface including the head opening 11h. By providing the disc retaining member 13 at this position, the disc retaining member 13 may also be used as a grip, which allows the user to hold the disc cartridge 1 thereon, when this disc cartridge 1 is loaded into a disc drive.

Hereinafter, the structures and the operations of the respective members will be described in detail. First, it will be described with reference to FIGS. 3A through 6B how the first and second-shutters 21 and 22 operate. FIGS. 3A, 4A, 5A and 6A are plan views illustrating the disc cartridge 1 with the upper shell 12 thereof removed, while FIGS. 3B, 4B, 5B and 6B are cross-sectional views thereof taken along the lines A—A and B—B shown in FIG. 3A, respectively. In. FIGS. 3B, 4B, 5B and 6B, the left part thereof illustrates a cross section that crosses the protrusion 21m of the first shutter 21. Accordingly, as the second shutter 22 moves, the cross section that crosses the protrusion 21m also moves. Also, in FIGS. 3A through 6B, only the lower shell 11 and the first and second shutters 21 and 22 are illustrated but the other members are removed for the sake of simplicity, and the disc 100 is not illustrated, either, to indicate the locations of the first and second shutters 21 and 22 clearly.

Figure 3A:
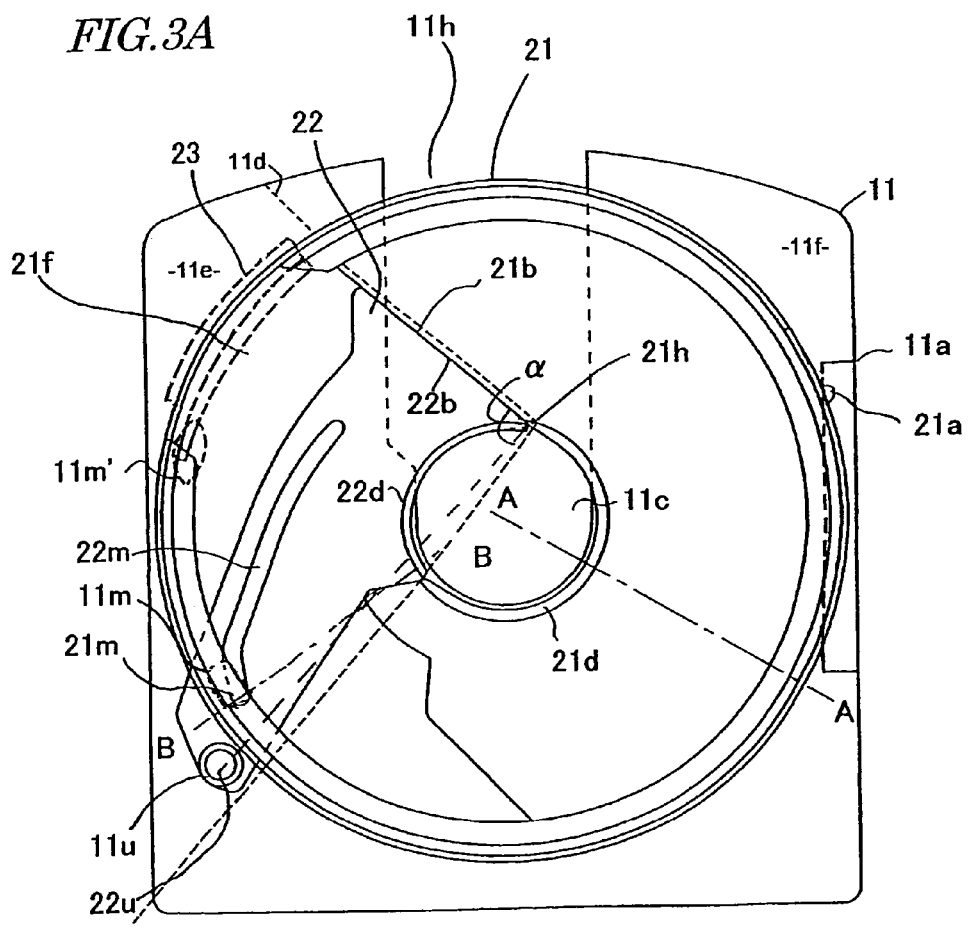
FIGS. 3A and 3B are a plan view and a cross-sectional view illustrating a state of the disc cartridge shown in FIG. 1 in which its shutters are closed.
Figure 3B:
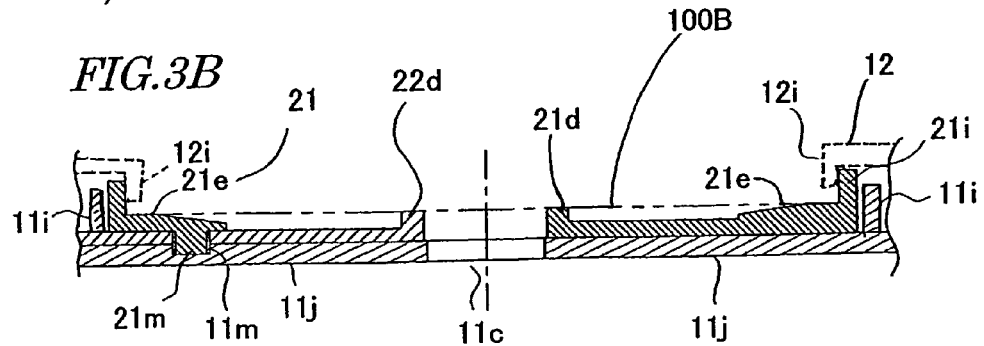

First, referring to FIGS. 3A and 3B, illustrated is a state of the disc cartridge 1 in which the head opening 11h is covered with the first and second shutters 21 and 22. The first and second shutters 21 and 22 are in contact with each other on their respective contact planes 21b and 22b. In this state, these contact planes 21b and 22b are located across the head opening 11h. The angle α defined between the line that connects one end 21h of the contact plane 21b to the center of the hole 22u of the second shutter 22 and the contact plane 21b is preferably greater than 90 degrees. The reason is as follows. Specifically, if the angle α is 90 degrees or less, the shutters 21 and 22 closed cannot be opened unless the first shutter 21 starts to move earlier than the second shutter 22. On the other hand, if the angle α is greater than 90 degrees, the second shutter 22 can move no matter whether the first shutter 21 is moving or not, and the first and second shutters 21 and 22 can be opened irrespective of the times at which these shutters 21 and 22 start to move. The disc inner edge supporting portions 21d and 22d of the first and second shutters 21 and 22 form a continuous ring that surrounds the chucking opening 11a as shown in FIG. 3A.

In FIG. 3A, the contact planes 21b and 22b are indicated by a single straight line, showing that the contact planes 21b and 22b stand perpendicularly to the inner lower surface 11j in this preferred embodiment. However, these contact planes 21b and 22b may define any angle other than 90 degrees with the inner lower surface 11j. For example, the contact plane 21b may define an angle of 30 degrees with the inner lower surface 11j while the other contact plane 22b may define an angle of 150 degrees with the inner lower surface 11j. Alternatively, the contact plane 21b may define an angle of 150 degrees with the inner lower surface 11j while the other contact plane 22b may define an angle of 30 degrees with the inner lower surface 11j. By sloping the contact planes in this manner, the contact planes 21b and 22b may be vertically overlapped with each other even if the contact planes 21b and 22b are not entirely in contact with each other while the first and second shutters 21 and 22 are closed. Thus, dust or dirt can be shut out from the disc cartridge 1 even more effectively.

As shown in FIG. 3B, the first and second shutters 21 and 22 are located on the same plane (i.e., at the same vertical level) on the inner lower surface 11j. The height of the protrusion 21m of the first shutter 21 is greater than the thickness of the second shutter 22, and the lower end of the protrusion 21m is received by a groove 11m that is formed on the inner lower surface 11j. Also, the sidewall 21i of the first shutter 21 is located in the space between the inner side surfaces 12i and 11i of the cartridge body 10.

As indicated by the two-dot chain in FIG. 3B, the second side 100A of the disc 100 is in contact with the disc inner edge supporting portions 21d and 22d and the disc outer edge supporting portion 21e. No information is stored on those areas of the disc 100 that are in contact with the disc inner edge supporting portions 21d and 22d and the disc outer edge supporting portion 21e. As shown, in FIG. 3A, the first shutter 21 includes the notch 21f, where the disc outer edge supporting portion 21e is discontinued. However, as will be described later, while the shutters 21 and 22 are closed, the disc supporting member 23 closes the notch 21f up. Accordingly, the signal recording area of the disc 100 is shut off from the air by the disc inner edge supporting portions 21d and 22d, disc outer edge supporting portion 21e and disc supporting member 23. As a result, the signal recording area of the disc 100 can be protected from dust or scratches.

Figure 4A:
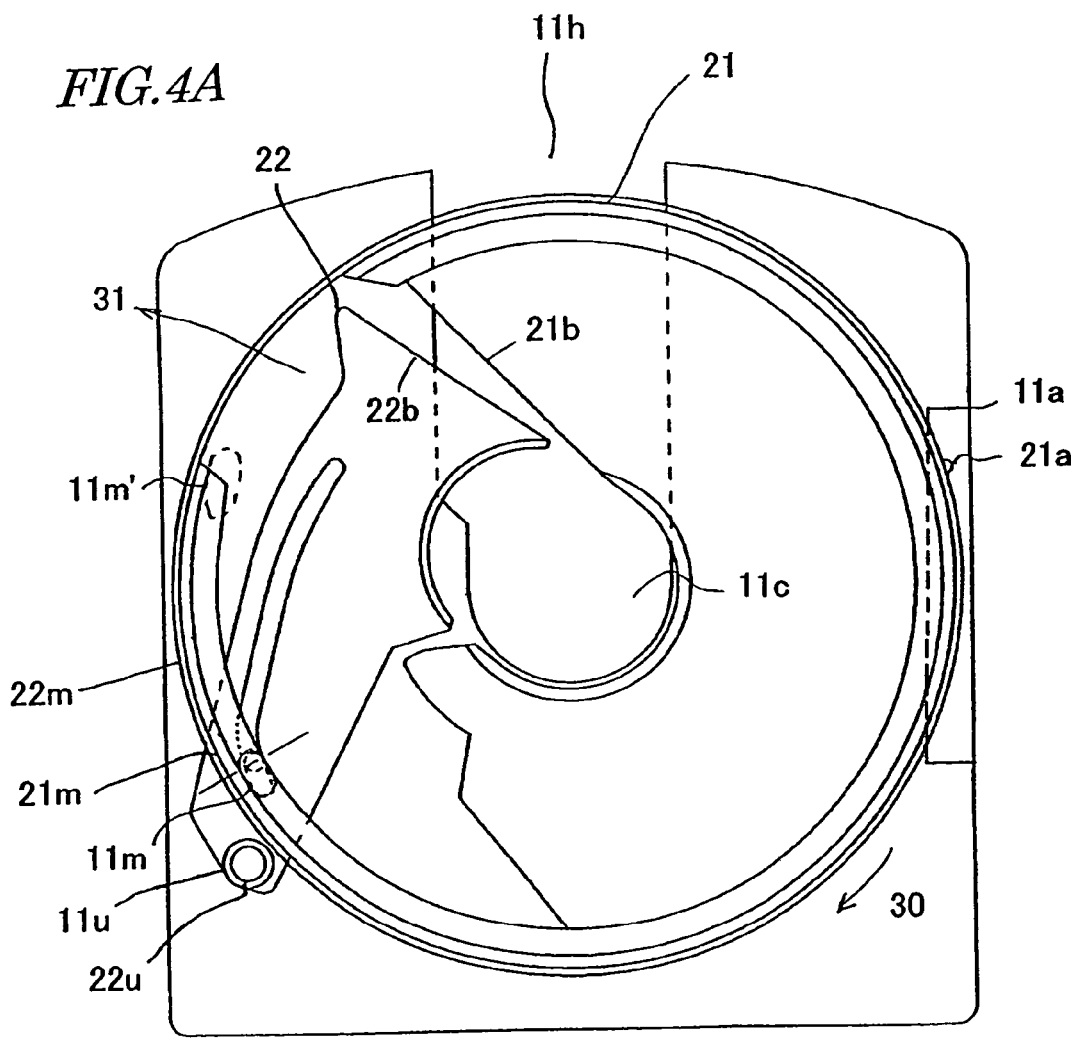
FIGS. 4A and 4B are a plan view and a cross-sectional view illustrating a state of the disc cartridge shown in FIG. 1 in which its shutters have just started to be opened.
Figure 4B:
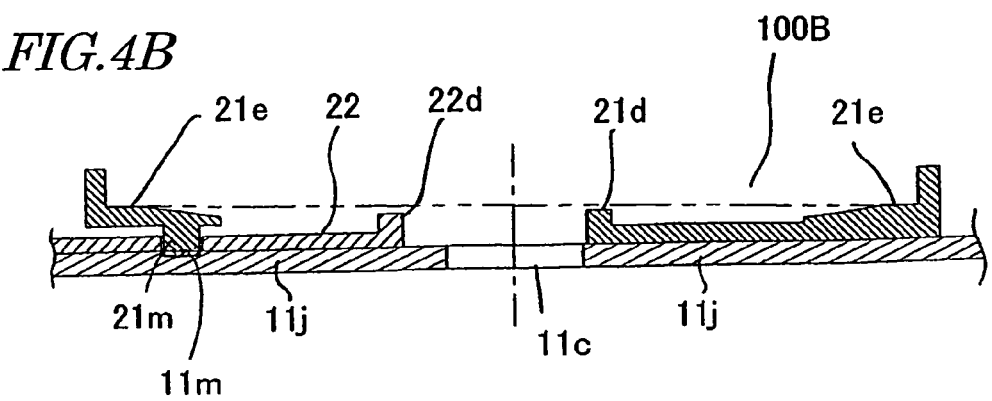

Next, the first and second shutters 21 and 22 start being opened. FIGS. 4A and 4B illustrate a state of the disc cartridge 1 in which the first and second shutters 21 and 22 have just started to open. To open the shutters 21 and 22, the protrusion 21a, exposed inside the opening 10a of the cartridge body 10, gets engaged with the shutter opening/closing mechanism of the disc drive and moved in the direction indicated by the arrow 130 in FIG. 4A. Then, the first shutter 21 starts to rotate to the direction 130 around the chucking opening 11c. As the first shutter 21 rotates, the protrusion 21m thereof also rotates to the same direction around the chucking opening 11c. Accordingly, the protrusion 21m moves along the guide groove 22m while pressing the side surface of the guide groove 22m that is engaged with the protrusion 21m. Thus, the second shutter 22 starts to rotate on the boss 11u to the direction indicated by the arrow 31. As a result, the contact planes 21b and 22b of the first and second shutters 21 and 22 separate from each other, i.e., the first and second shutters 21 and 22 start to open.

As shown in FIG. 4B, the groove 11m decreases its depth suddenly, and the protrusion 21m is pushed up by the bottom of the groove 11m. Thus, the protrusion 21m and its surrounding portion of the first shutter 21 get separated from the second shutter 22. As a result, the top of the disc outer edge supporting portion 21e and the tops of the disc inner edge supporting portions 21d and 22d are not located on the same plane anymore, and the second side 100A of the disc 100 is now supported only by the disc outer edge supporting portion 21e. That is to say, the disc inner edge supporting portions 21d and 22d are out of contact with the second side 100A of the disc 100. Accordingly, even if the disc inner edge supporting portion 22d moves to a position under the signal recording area of the second side 100A of the disc 100, the disc inner edge supporting portion 22d will not contact with the disc 100. As a result, the disc inner edge supporting portion 22d will do no damage on the signal recording area of the second side 100A.

Figure 5A:
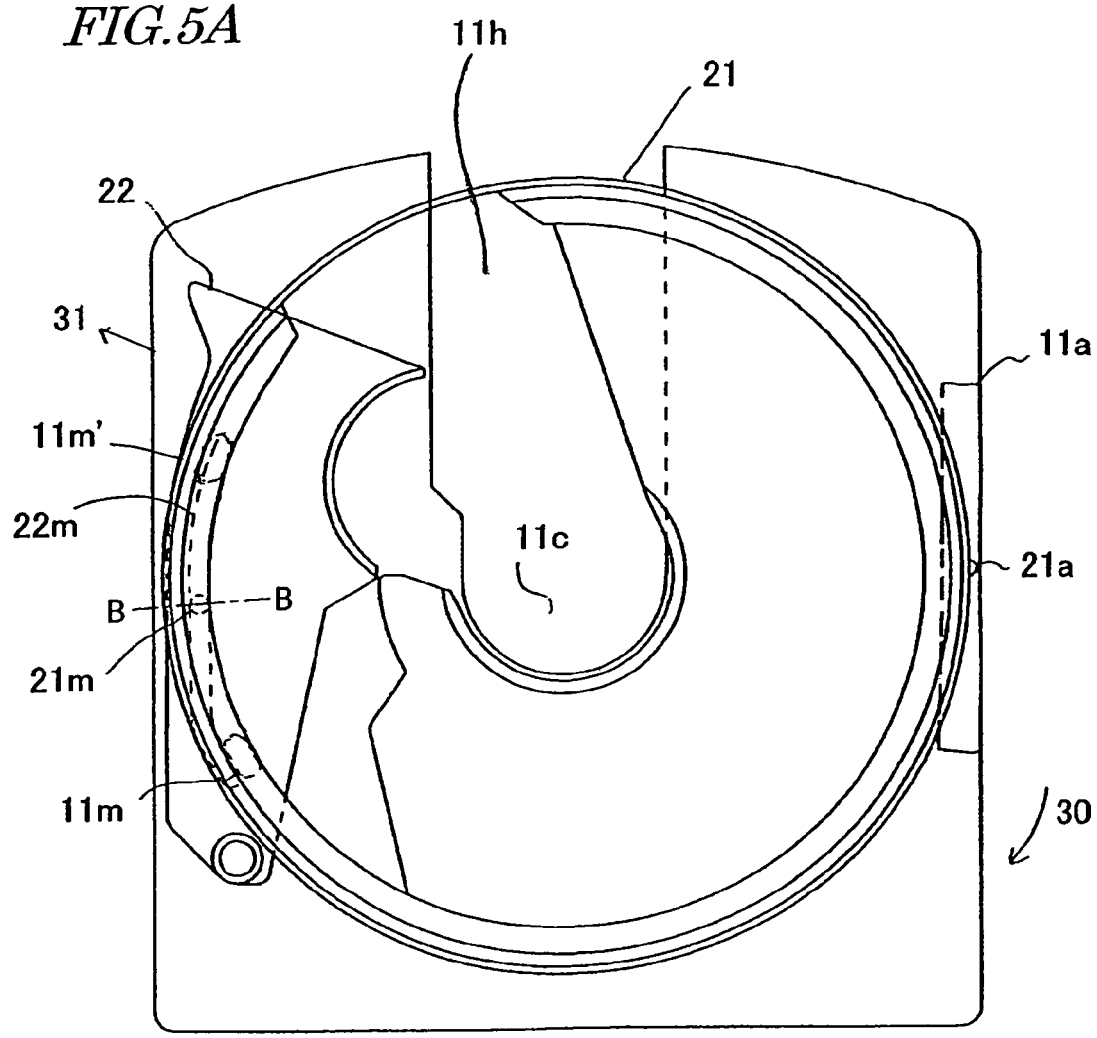
FIGS. 5A and 5B are a plan view and a cross-sectional view is a plan view illustrating a state of the disc cartridge shown in FIG. 1 in which its shutters are going to be opened.
Figure 5B:
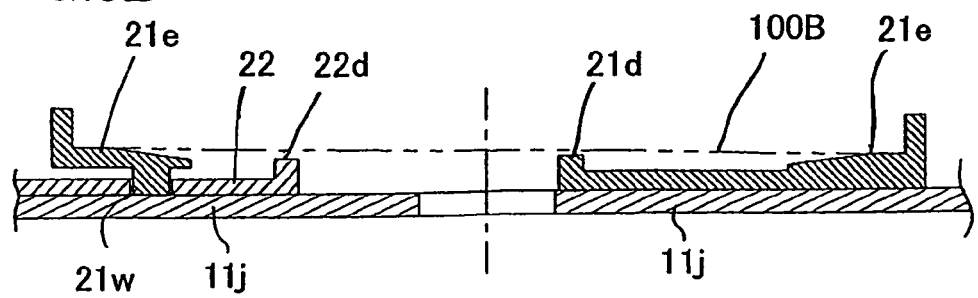

As shown in FIGS. 5A and 5B, as the first shutter 21 further rotates, the protrusion 21m further moves along the guide groove 22m toward the other end thereof while pressing the side surface of the guide groove 22m. In the meantime, the second shutter 22 further rotates to the direction 31, thereby exposing the head opening 11h gradually. On the cross section illustrated in FIG. 5B, the groove 11m that is present on the inner lower surface 11j in FIG. 4B no longer exists. As already described with reference to FIGS. 4A and 4B, the height of the protrusion 21m is greater than the thickness of the second shutter 22. Thus, in the vicinity of the protrusion 21m, the top of the disc outer edge supporting portion 21e is higher than that of the disc inner edge supporting portion 22d. Accordingly, the disc inner edge supporting portions 21d and 22d will not contact with the second side 100A of the disc 100.

Figure 6A:
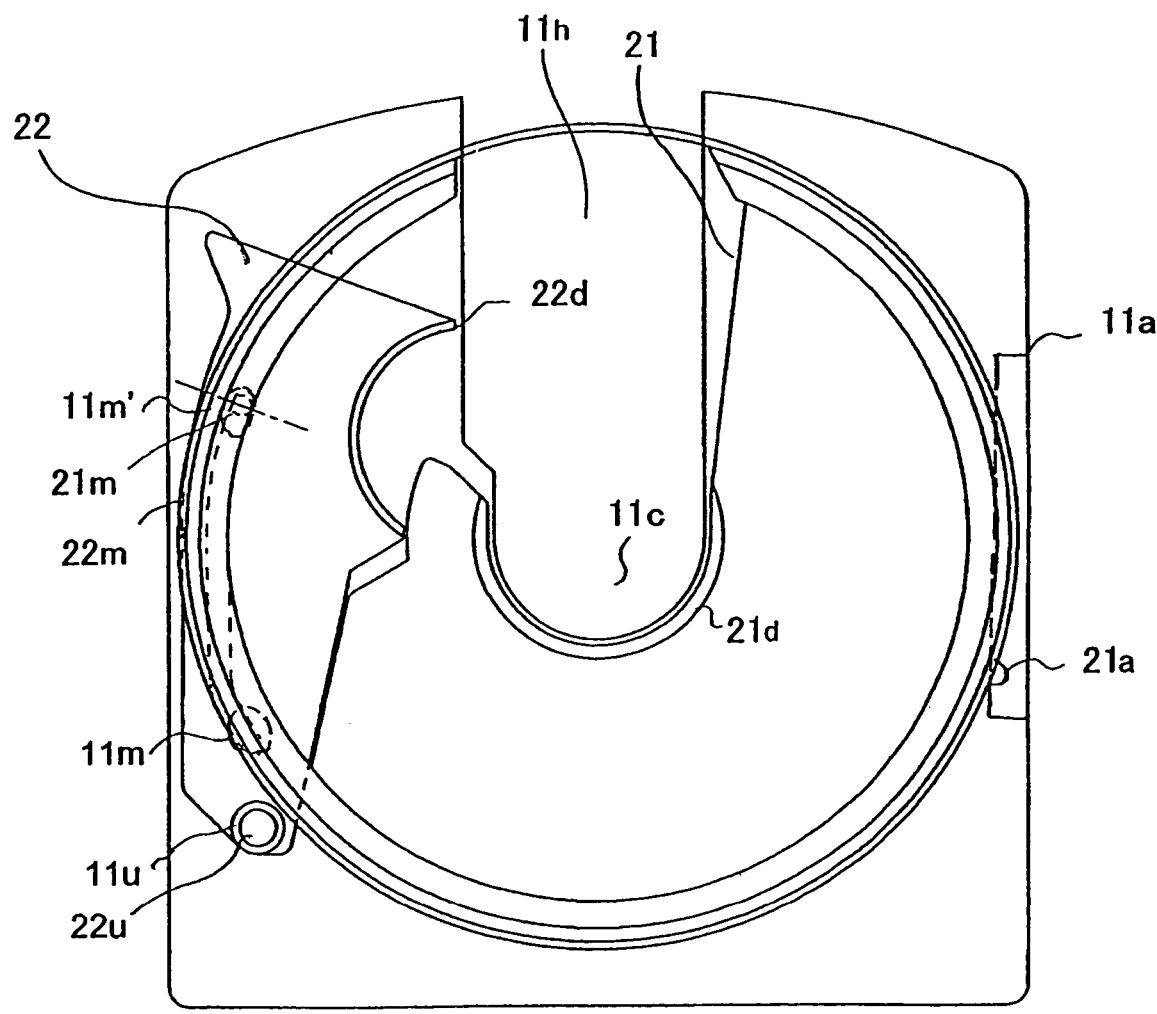
FIGS. 6A and 6B are a plan view and a cross-sectional view is a plan view illustrating a state of the disc cartridge shown in FIG. 1 in which its shutters are opened.
Figure 6B:
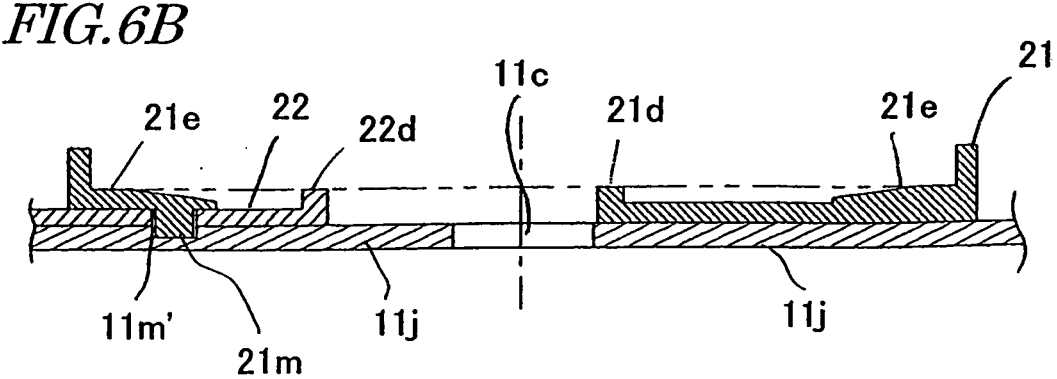

FIGS. 6A and 6B illustrate a state of the disc cartridge 1 in which the first and second shutters 21 and 22 are fully opened. As shown in FIG. 6A, in this state, the head opening 11h is entirely exposed by the first and second shutters 21 and 22. By this time, the protrusion 21m of the first shutter 21 has reached the other end of the guide groove 22m. Also, as shown in FIG. 6B, the lower end of the protrusion 21m is now received by another groove 11m' that is also formed on the inner lower surface 11j. Accordingly, the disc outer edge supporting portion 21e and the disc inner edge supporting portions 21d and 22d are present on the same plane.

In the state where the head opening 11h is completely exposed by the first and second shutters 21 and 22, the disc 100 has already been chucked by the disc drive via the chucking opening 11c over the two-dot chain shown in FIG. 6B. Thus, in such a state, the disc 100 does not contact with the disc outer edge supporting portion 21e or the disc inner edge supporting portions 21d and 22d.

Next, the structure and operation of the disc supporting member 23 will be described.

As shown in FIG. 7A, the disc supporting member 23 includes two guide grooves 23s that receive the guide pins 11s provided on the inner lower surface 11j, and can move parallelly to the direction in which the guide pins 11s extend.

Figure 7B:
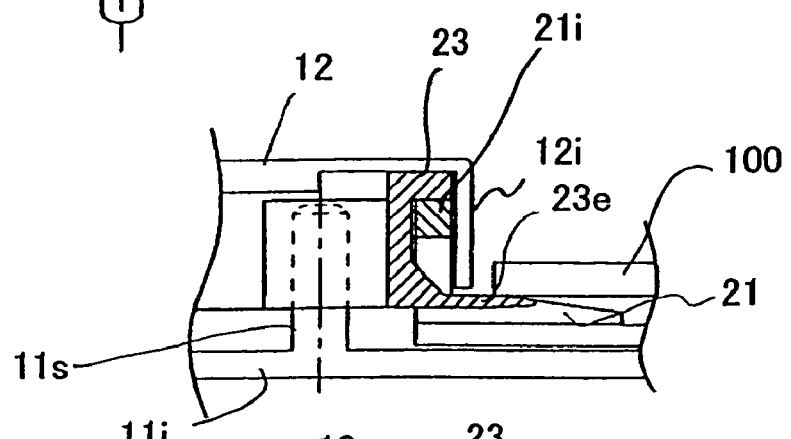
FIGS. 7B and 7C are cross-sectional views of the disc supporting member taken along the plane C shown in FIG. 7A.
Figure 7C:
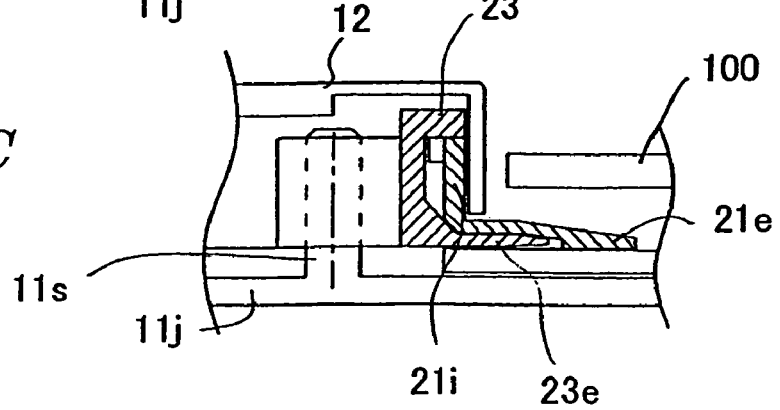

FIGS. 7B and 7C are cross-sectional views taken along the plane C shown in FIG. 7A. Specifically, FIG. 7B illustrates a state of the disc supporting member 23 when the first and second shutters 21 and 22 are closed. As shown in FIG. 7B, in that state, the disc supporting member 23 is in an elevated position, and the disc 100 is in contact with the disc outer edge supporting portion 23e of the disc supporting member 23. On the other hand, FIG. 7C illustrates a state of the disc supporting member 23 when the first and second shutters 21 and 22 are opened. As shown in FIG. 7C, in that state, the disc supporting member 23 is in a lowered position and is located under the disc outer edge supporting portion 21e of the first shutter 21. As can be seen from FIGS. 7B and 7C, the disc supporting member 23 is moved up and down by the sidewall 21i of the first shutter 21.

The transition from the state shown in FIG. 7B into the state shown in FIG. 7C will be described in detail. FIGS. 8A through 8D are internal cross-sectional views of the disc supporting member 23 and the first shutter 21 as viewed parallelly to the first and second sides of the disc 100. FIG. 8A illustrates a relative positional relationship between the disc supporting member 23 and the first shutter 21 in a state where the head opening 11h is covered with the first and second shutters 21 and 22. As shown in FIG. 8A, the notch 21f of the disc outer edge supporting portion 21e is bridged by the disc outer edge supporting portion 23e of the disc supporting member 23. Thus, the disc outer edge supporting portions 21e and 23e are in contact with the outer edge of the disc 100 continuously, thereby holding the disc 100 thereon. As shown in FIG. 8A, one end 21s of the disc outer edge supporting portion 21e and one end 23h of the disc outer edge supporting portion 23e are tapered upward. On the other hand, another end 21r of the disc outer edge supporting portion 21e and the other end 23j of the disc outer edge supporting portion 23e are tapered downward. Furthermore, the top of the sidewall 21i of the first shutter 21 also has a sloped portion 21t, and a protrusion 23g is provided for a portion of the disc supporting member 23 that is contact with the top of the sidewall 21i of the first shutter 21. In the state illustrated in FIG. 8A, the disc supporting member 23 has its position defined by the protrusion 23g and the end 23j.

When the first shutter 21 has just started to rotate to the direction 31 to get the first and second shutters 21 and 22 opened, the tapered end 21r of the disc outer edge supporting portion 21e will slide upward on the tapered end 23h of the disc outer edge supporting portion 23e, while the other tapered end 23j will slid downward on the tapered end 21s as shown in FIG. 8B. In the meantime, the protrusion 23g also goes down the slope 21t. As a result, the disc supporting member 23 goes down in its entirety while keeping its position. The protrusion 23g will soon reach the bottom of the slope 21t as shown in FIG. 8C. Then, the tapered end 21r will also be completely landed on the tapered end 23h. As a result, the disc supporting member 23 is now held by the top of the sidewall 21i of the first shutter 21.

Thereafter, as the first shutter 21 further rotates, the disc outer edge supporting portion 23e of the disc supporting member 23 slides into under the disc outer edge supporting portion 21e of the first shutter 21 as shown in FIG. 8D. As described above, only while the head opening 11h is covered with the first and second shutters 21 and 22, the disc supporting member 23 is located in its elevated position to close up the notch 21f of the first shutter 21. On the other hand, when the head opening 11h is no longer covered with the first and second shutters 21 and 22, the disc supporting member 23 is located in its lowered position to avoid contact with the first shutter 21 rotating.

Next, the structure of the disc retaining member 13 will be described. FIG. 9A illustrates one of the two contact portions 13b and one of the two shafts 13t (see FIG. 2) that are located near the locking member 14. FIG. 9B is a cross-sectional view taken along the line D shown in FIG. 9A and illustrates the position of the disc retaining member 13 in the state where the first and second shutters 21 and 22 are closed. As shown in FIG. 9B, the contact portion 13b is spaced apart from the outer edge of the disc 100 by a distance L1. The contact portion 13b is covered with a material 13d having a large coefficient of friction (e.g., rubber). Accordingly, even if the user tries to manually rotate the disc 100 intentionally, the disc 100 will not rotate so easily. Thus, while stored in this disc cartridge 1, the disc 100 will not move inconstantly.

The shaft 13t is provided with the spring 15 that has one end thereof pressed by the protrusion 14t of the locking member 14. Accordingly, an elastic force is applied to the disc retaining member 13 in such a direction as to press the disc 100 against the first shutter 21.

FIG. 9C illustrates a state of the disc retaining member 13 when the head opening 11h is exposed by the first and second shutters 21 and 22. Another protrusion 13c is provided on the bottom of the disc retaining member 13 so as to contact with the top of the sidewall 21i of the first shutter 21. As shown in FIG. 9C, a portion of the sidewall 21i has an increased height H1 to push the protrusion 13c upward while the head opening 11h is exposed by the first and second shutters 21 and 22. Thus, the disc retaining member 13 is lifted and separated from the disc 100. In that state, the disc 100 is freely rotatable.

However, the disc retaining member 13 still protrudes into the disc window 12w, and can serve as a disc stopper for preventing the disc 100 from dropping down through the disc window 12w. Thus, even when this disc cartridge 1 is loaded into a vertically mounted disc drive, for example, the disc 100 will not drop inside the disc drive.

As shown in FIG. 2, the sidewall 21i surrounds the entire side surface of the first shutter 21. Accordingly, by appropriately determining the position of that portion of the sidewall 21i with the increased height H1, the disc 100 can be released at any time before the first and second shutters 21 and 22 closed are fully opened.

FIG. 9D illustrates a state where the disc retaining member 13 has its position no longer regulated by the elastic force applied from the spring 15. As shown in FIG. 9A, when one end of the spring 15 gets released from the protrusion 14t of the locking member 14 by sliding the locking member 14 in the direction indicated by the arrow 134, the spring 15, as well as the disc retaining member 13, can freely rotate with respect to the cartridge body 10. Accordingly, in that state, the disc retaining member 13 can be rotated and lifted so that its end is located outside of the disc window 12w. Then, the disc 100 may be either removed or stored from/into this disc cartridge 1. Once the disc 100 has been removed or stored, the disc retaining member 13 may be pushed down toward the disc window 12w again and the locking member 14 may be pushed back to its locking position, thereby getting the disc 100 retained by the disc retaining member 13 again as shown in FIG. 9B.

In the preferred embodiment described above, the spring 15 is a torsion spring and one end thereof is fixed by the locking member 14. Alternatively, the spring 15 may also be a toggle spring for applying an elastic force in various directions that change with the angle of rotation. In that case, the operations described above are realizable without using the locking member 14.

Second Embodiment

Hereinafter, a disc cartridge according to a second specific preferred embodiment of the present invention will be described with reference to the accompanying drawings.

The disc cartridge of this second preferred embodiment includes a disc supporting member 123 instead of the disc supporting member 23 of the disc cartridge 1 of the first preferred embodiment described above. In the other respects, the disc cartridge is the same as the disc cartridge 1 and the following description of the second preferred embodiment will be focused on the structure and the operation of the disc supporting member 123.

Figure 10A:
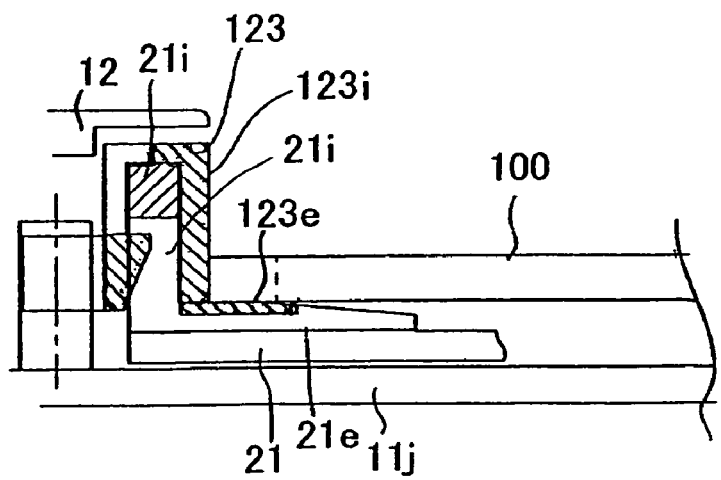
FIGS. 10A and 10B are cross-sectional views illustrating the structure of a disc supporting member of a disc cartridge according to a second specific preferred embodiment of the present invention.

FIG. 10A is a cross-sectional view illustrating a state of the disc supporting member 123 when the first and second shutters 21 and 22 are closed. FIG. 10A corresponds to FIG. 7B for the first preferred embodiment described above. As shown in FIG. 10A, the disc supporting member 123 includes a sidewall 123i, at the bottom of which a disc outer edge supporting portion 123e is formed. The sidewall 123i is located inside the sidewall 21i of the first shutter 21. Accordingly, the inner side surface 12i of the cartridge body 10 includes a notch beside the disc supporting member 123 so as not to interfere with the sidewall 123i of the disc supporting member 123. As in the state illustrated in FIG. 7B, the disc outer edge supporting portion 123e closes up the notch 21f of the first shutter 21, and the two disc outer edge supporting portions 123e and 21e contact with the outer edge of the second side 100A of the disc 100 in the state shown in FIG. 10A. Thus, the signal recording area of the second side 100A of the disc 100 can be protected from dust or scratches.

Figure 10B:
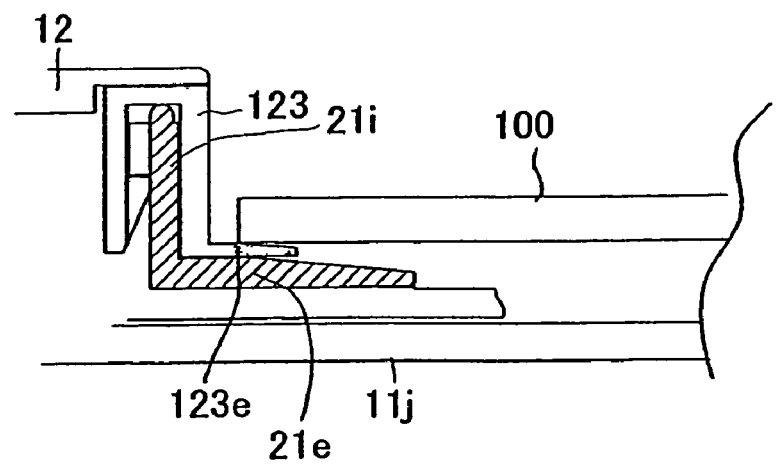

FIG. 10B illustrates a state of the disc supporting member 123 when the first and second shutters 21 and 22 are not closed anymore. In that state, the disc supporting member 123 has moved upward so that the disc outer edge supporting portion 123e thereof is located over, and stacked on, the disc outer edge supporting portion 21e of the first shutter 21. The disc supporting member 123 may be moved in this manner as already described with reference to FIGS. 8A through 8D. Specifically, a portion of the sidewall 21i of the first shutter 21, which the disc supporting member 123 passes as the first shutter 21 rotates, may have a locally increased height.

By locating the disc outer edge supporting portion 123e over the disc outer edge supporting portion 21e of the first shutter 21, the disc outer edge supporting portion 123e can hold the disc 100 thereon at a vertical level higher than that of the disc outer edge supporting member 21e. In that state, the disc inner edge supporting portion 22d will separate from, and be out of contact with, the disc 100 because the disc 100 is held at a higher vertical level. As a result, the disc inner edge supporting portion 22d will not contact with the signal recording area of the disc 100.

Third Embodiment

Hereinafter, a disc cartridge according to a third specific preferred embodiment of the present invention will be described with reference to the accompanying drawings.

The disc cartridge of the third preferred embodiment provides a disc outer edge supporting portion 12e for the upper shell 12 instead of the disc supporting member 23 of the first preferred embodiment described above.

Figure 11A:
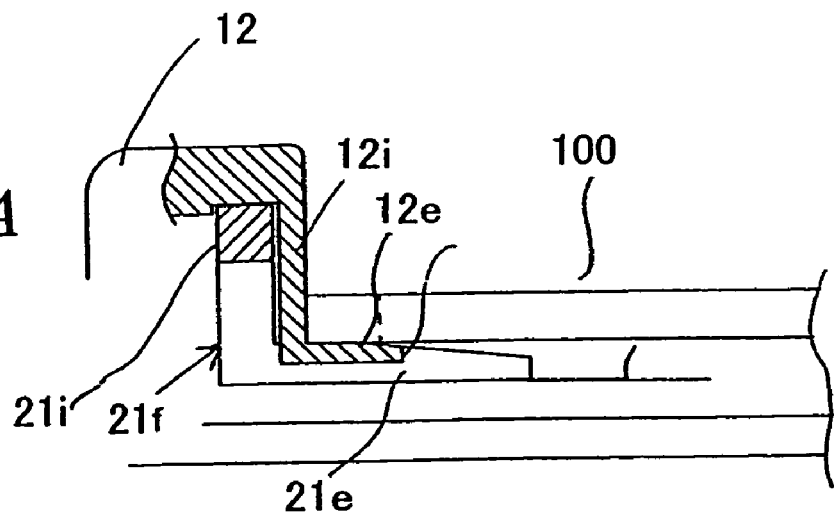
FIGS. 11A and 11B are cross-sectional views illustrating the structure of a disc supporting member of a disc cartridge according to a third specific preferred embodiment of the present invention.

FIG. 11A is a cross-sectional view illustrating a state of the disc outer edge supporting portion 12e when the first and second shutters 21 and 22 are closed. FIG. 11A corresponds to FIG. 7B for the first preferred embodiment described above. As shown in FIG. 11A, the disc outer edge supporting portion 12e extends from the bottom of the inner side surface 12i toward the center of the disc 100. The disc outer edge supporting portion 12e is provided near the position of the notch 21f of the first shutter 21 while the first and second shutters 21 and 22 are closed as shown in FIG. 3A. As shown in FIG. 11A, the upper surface of the disc outer edge supporting portion 12e is as high as that of the disc outer edge supporting portion 21e of the first shutter 21.

In the state illustrated in FIG. 11A, the first and second shutters 21 and 22 are closed as in the state illustrated in FIG. 7B. Accordingly, the disc outer edge supporting portion 12e closes up the notch 21f of the first shutter 21 and the two disc outer edge supporting portions 12e and 21e contact with the outer edge of the second side 100A of the disc 100. Thus, the signal recording area of the second side 100A of the disc 100 can be protected from dust or scratches.

Figure 11B:
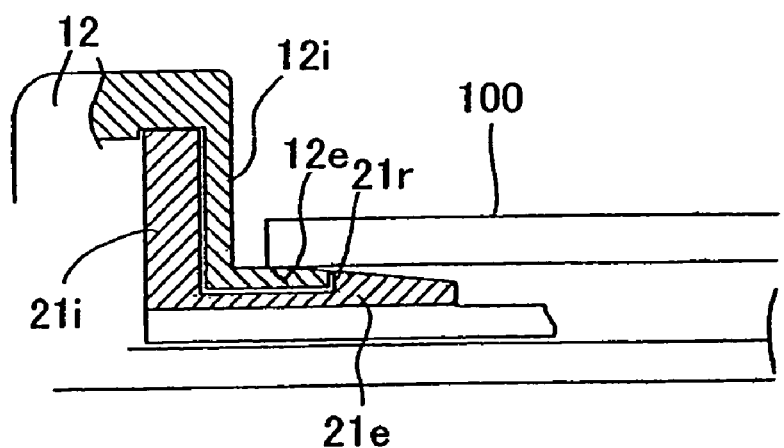

However, the disc outer edge supporting portion 12e is fixed to the upper shell 12 and does not move. Accordingly, when the first shutter 21 is rotated to get the first and second shutters 21 and 22 opened, the disc outer edge supporting portion 12e will interfere with the disc outer edge supporting portion 21e of the first shutter 21. To avoid such interference, part of the disc outer edge supporting portion 21e that overlaps with the disc outer edge supporting portion 12e when the first shutter 21 is rotated is provided with a concave portion 21r as shown in FIG. 11B. Accordingly, when the first shutter 21 is rotated, the disc outer edge supporting portion 12e is received inside the concave portion 21r of the disc outer edge supporting portion 21e.

In this preferred embodiment, the disc outer edge supporting portion 12e is fixed and need not be moved synchronously with the first shutter 21. Thus, the disc cartridge can have a simplified structure.

Fourth Embodiment

Hereinafter, a disc cartridge according to a fourth specific preferred embodiment of the present invention will be described with reference to the accompanying drawings. The disc cartridge of this fourth preferred embodiment includes shutters having different structures from the counterparts of the first preferred embodiment described above.

Figure 12A:
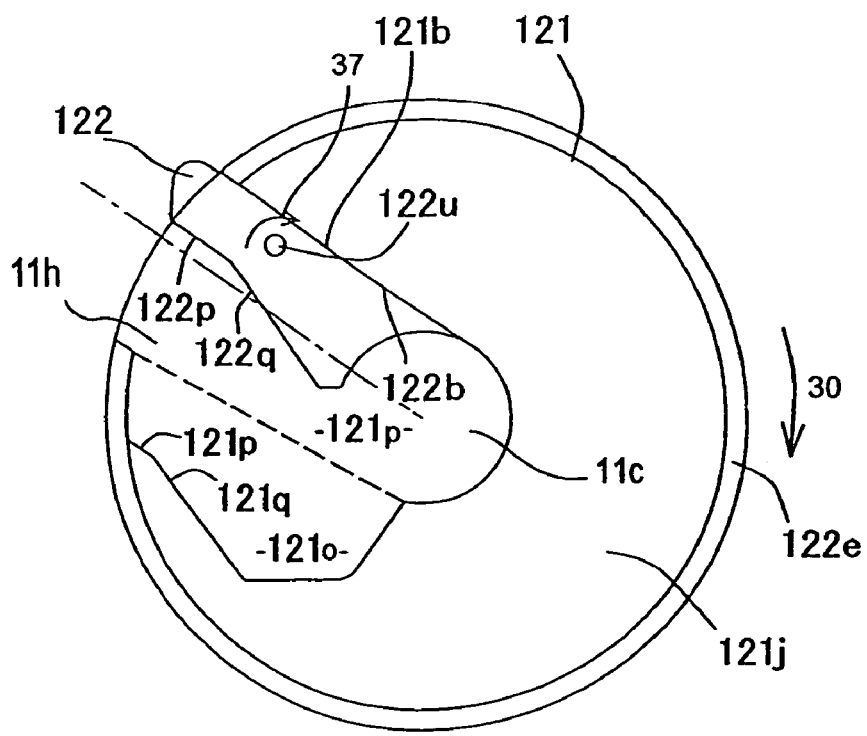
FIGS. 12A and 12B are plan views illustrating the structure of shutters of a disc cartridge according to a fourth specific preferred embodiment of the present invention.
Figure 12B:
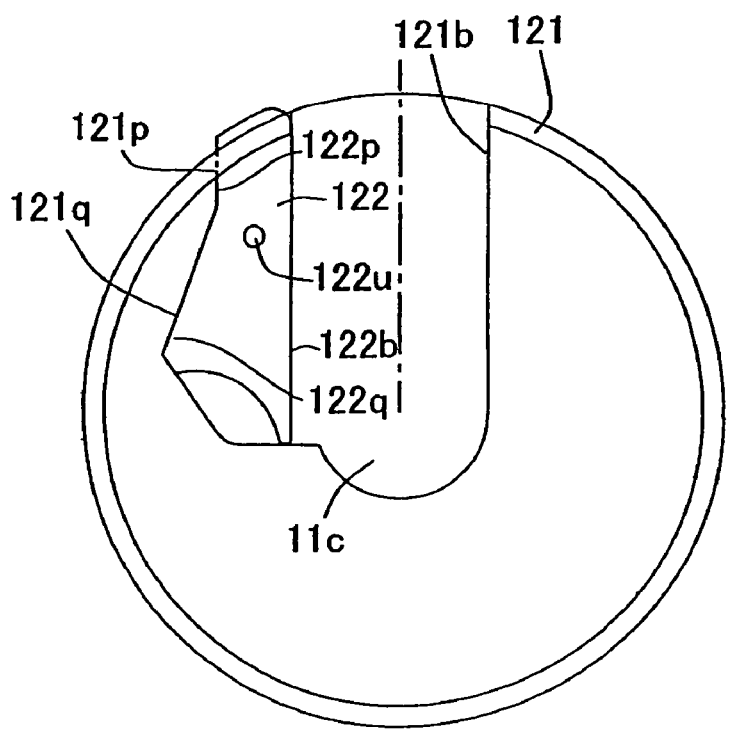

FIGS. 12A and 12B schematically illustrate the structures of first and second shutters 121 and 122 of the disc cartridge according to this fourth preferred embodiment. Specifically, FIG. 12A illustrates the closed state of the first and second shutters 121 and 122, while FIG. 12B illustrates the opened state thereof.

The first shutter 121 includes a bottom 121j that has an opening made up of two areas 121p and 121o. The area 121p has a planar shape approximately corresponding to the combined planar shape of the head and chucking openings 11h and 11c, while the area 121o has a planar shape substantially corresponding to that of the second shutter 122. As in the first preferred embodiment described above, the first shutter 121 is rotatable around the center of the chucking opening 11c.

On the other hand, the second shutter 122 is rotatable on a hole 122u, which is located inside the disc storage portion of the disc cartridge. That is to say, the second shutter 122 has its center of rotation inside the disc storage portion.

The first and second shutters 121 and 122 are disposed on the same plane. As shown in FIG. 12A, while the first and second shutters 121 and 122 are closed, the contact plane 121b of the first shutter 121 is in contact with the contact plane 122b of the second shutter 122. Accordingly, the movement of the second shutter 122 is regulated by the first shutter 121. That is to say, unless the first shutter 121 starts to rotate, the first and second shutters 121 and 122 keep closed.

When the first shutter 121 is rotated to the direction indicated by the arrow 130 to get the first and second shutters 121 and 122 opened, the contact plane 121b of the first shutter 121 separates itself from the contact plane 122b of the second shutter 122. Then, nothing regulates the movement of the second shutter 122 and the second shutter 122 can now freely rotate on the hole 122u.

As the first shutter 121 further rotates, another contact plane 121r of the first shutter 121 will soon contact with another contact plane 122r of the second shutter 122. Then, the second shutter 122 is pressed by the first shutter 121 to rotate to the direction indicated by the arrow 137.

As the first and second shutters 121 and 122 further rotate, a third contact plane 121q of the first shutter 121 will soon contact with a third contact plane 122q of the second shutter 122 as shown in FIG. 12B. After that, the first shutter 121 cannot rotate anymore. That is to say, the first and second shutters 121 and 122 are fully opened.

This fourth preferred embodiment needs no mechanism for interlocking the first and second shutters 121 and 122 with each other, thus simplifying the structure of the disc cartridge.

Fifth Embodiment

Hereinafter, a disc cartridge according to a fifth specific preferred embodiment of the present invention will be described with reference to the accompanying drawings.

In the disc cartridge 1 according to the first preferred embodiment described above, the disc retaining member 13 shown in FIG. 1 presses the disc 100 against the inner lower surface 11j of the cartridge body 10 and holds it thereon. Alternatively or additionally, the disc cartridge of this fifth preferred embodiment uses disc holders 22i and 24.

Figure 13A:
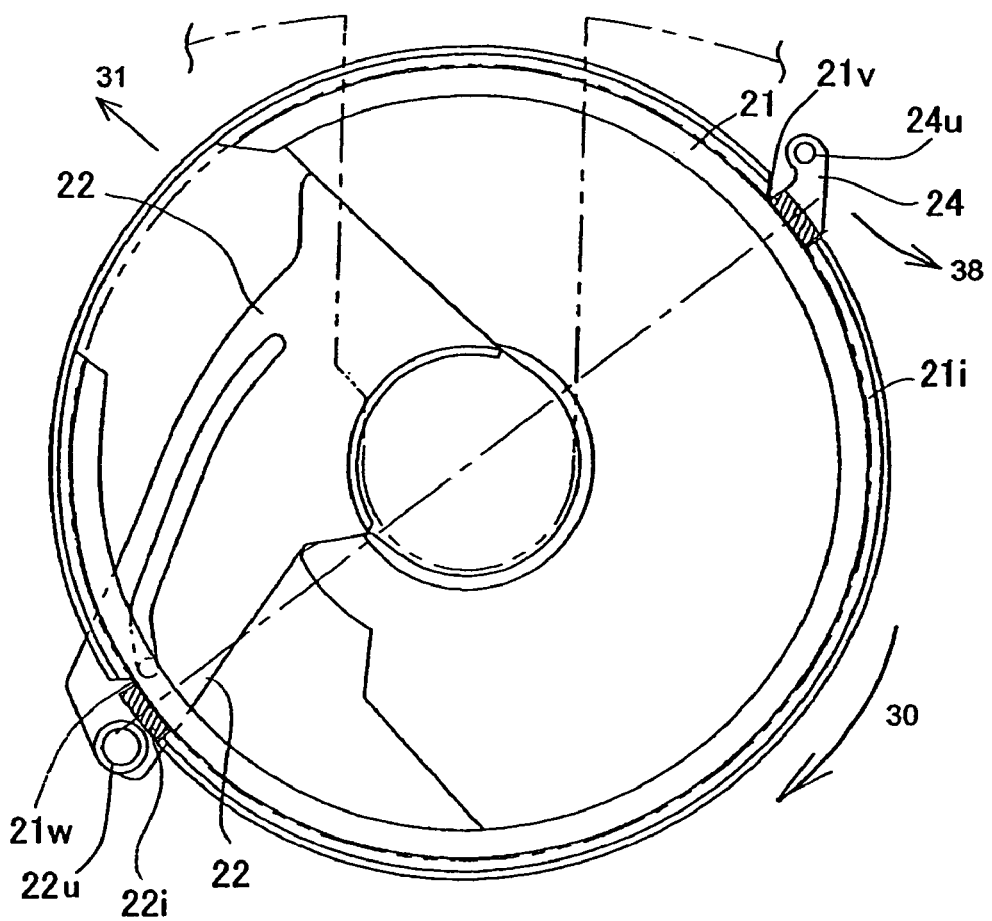
FIGS. 13A and 13B are a plan view and a cross-sectional view illustrating the structure of disc holders of a disc cartridge according to a fifth specific preferred embodiment of the present invention.
Figure 13B:
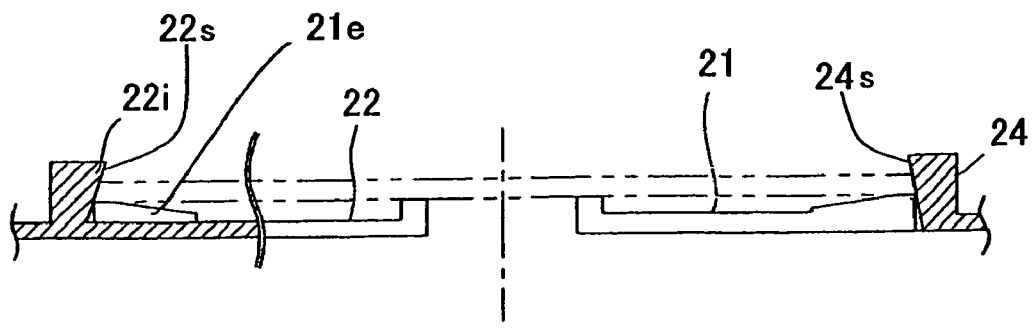

As shown in FIGS. 13A and 13B, the disc cartridge of the fifth preferred embodiment includes disc holders 22i and 24 with downwardly tapered slopes 22s and 24s, respectively. The disc holder 22i is provided near the hole 22u of the second shutter 22 so that the slope 22s thereof contacts with the outer edge of the disc 100 while the first and second shutters 21 and 22 are closed. On the other hand, the disc holder 24 is provided at a position that is symmetrical to the disc holder 22i with respect to the center of the disc 100. The disc holder 24 is also provided so that the slope 24s thereof contacts with the outer edge of the disc 100 while the first and second shutters 21 and 22 are closed. Furthermore, the disc holder 24 has a hole 24u and is rotatable on the hole 24u. Although not shown, an elastic force is applied from some elastic member such as a torsion spring to the disc holder 24 to make the slope 24s press the disc 100 down.

As shown in FIG. 13A, the sidewall 21i of the first shutter 21 has notches 21w and 21v to receive the disc holders 22i and 24, respectively, i.e., so that the sidewall 21i does not interfere with the disc holder 22i or 24.

In such a structure, while the first and second shutters 21 and 22 are closed, the slopes 22s and 24s of the disc holders 22i and 24 contact with the outer edge of the disc 100 and press the disc 100 downward and toward the center of the disc 100. In this manner, the disc 100 can be horizontally fixed and held at its predetermined position inside the disc storage portion.

When the first shutter 21 is rotated to the direction indicated by the arrow 130 to get the first and second shutters 21 and 22 opened, the sidewall 21i of the first shutter 21 rotates the disc holder 24 to the direction indicated by the arrow 38. As a result, the slope 24s thereof separates itself from the disc 100.

On the other hand, as the first shutter 21 rotates, the second shutter 22 also rotates to the direction indicated by the arrow 31. At the same time, the disc holder 22i also rotates on its hole 22u to the direction 31. As a result, the slope 22s also separates itself from the disc 100. In this manner, as the first and second shutters 21 and 22 are opened, the disc holders 22i and 24 releases the disc 100.

Conversely, to close the first and second shutters 21 and 22 opened, the disc holders 22i and 24 move in the opposite directions. That is to say, the disc holders 22i and 24, located outside of the sidewall 21i, approach the disc 100 by way of the notches 21w and 21v of the sidewall 21i, respectively. Accordingly, no matter where the disc 100 is located inside the sidewall 21i, the disc holders 22i and 24 can always hold the disc 100 thereon in such a manner that the center of the disc 100 is aligned with the center of the disc storage portion.

Sixth Embodiment

Hereinafter, a disc cartridge according to a sixth specific preferred embodiment of the present invention will be described with reference to the accompanying drawings.

In the disc cartridge 1 of the first preferred embodiment described above, to prevent the disc inner edge supporting portion 22d of the second shutter 22 from contacting with the signal recording side 100A of the disc 100 while the first and second shutters 21 and 22 are going to be opened, the top of the protrusion 21m of the first shutter 21 is raised to a vertical level higher than that of the disc inner edge supporting portion 22d. In this sixth preferred embodiment, a different type of structure is used to prevent the disc inner edge supporting portion 22d of the second shutter 22 from contacting with the signal recording side 100A of the disc 100.

Figure 14:
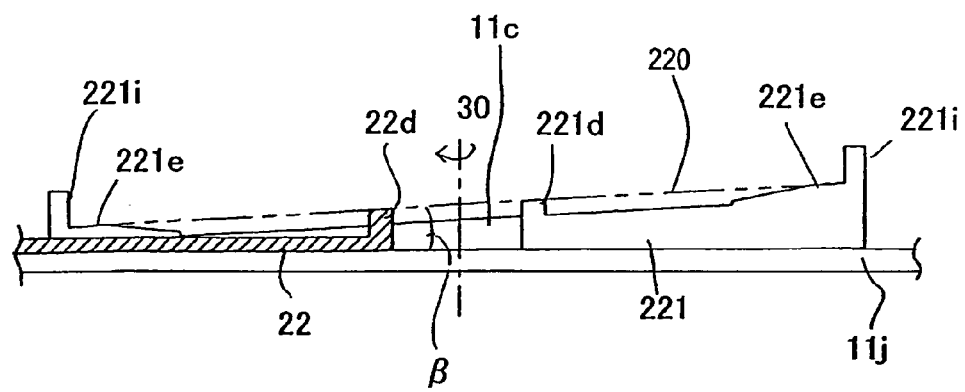
FIG. 14 is a cross-sectional view illustrating the structure of a disc cartridge according to a sixth specific preferred embodiment of the present invention.

FIG. 14 is a cross-sectional view of the disc cartridge of the sixth preferred embodiment taken along the line E—E shown in FIG. 1.

The disc cartridge of this preferred embodiment includes a first shutter 221 and the second shutter 22. As shown in FIG. 14, a plane 220 that connects together the upper surfaces of a disc outer edge supporting portion 221e and a disc inner edge supporting portion 221d of the first shutter 221 defines an angle β with respect to the inner lower surface 11j. The angle β is preferably approximately 0.3 degree to approximately 1.0 degree.

In such a structure, when the first shutter 221 is rotated to the direction indicated by the arrow 130 to get the first and second shutters 221 and 22 opened, the first shutter 221 rotates while keeping the plane 220 defined with respect to the inner lower surface 11j. Accordingly, as the first shutter 221 rotates, the plane 220 goes upward and away from the disc inner edge supporting portion 22d. That is to say, even if the first shutter 221 is rotated, the disc inner edge supporting portion 22d will not contact with the disc 100, thus doing no damage on the signal recording side 100A of the disc 100.

Seventh Embodiment

Hereinafter, a disc cartridge according to a seventh specific preferred embodiment of the present invention will be described with reference to the accompanying drawings.

Figure 15:
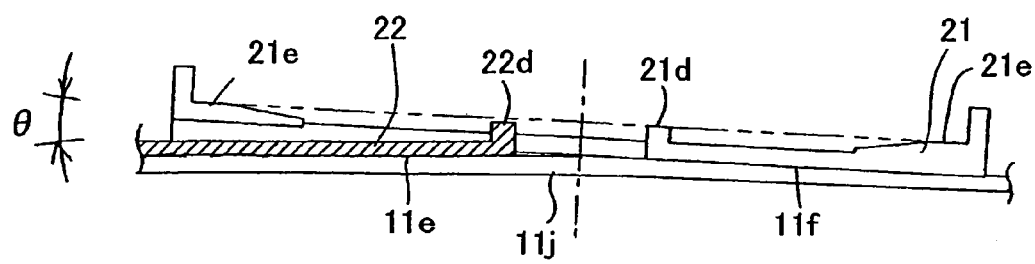
FIG. 15 is a cross-sectional view illustrating a structure of a disc cartridge according to a seventh specific preferred embodiment of the present invention.

Just like the sixth preferred embodiment described above, the disc cartridge of this seventh preferred embodiment also includes a structure that is specially designed to prevent the disc inner edge supporting portion 22d of the second shutter 22 from contacting with the signal recording side 100A of the disc 100. FIG. 15 is a cross-sectional view of the disc cartridge of the seventh preferred embodiment taken along the line E—E shown in FIG. 1. As shown in FIG. 15, the top of the disc outer edge supporting portion 21e of the first shutter 21 defines an angle θ with the inner lower surface 11j of the cartridge body 10. The angle θ is preferably approximately 0.5 degree to approximately 3.0 degrees. On the other hand, the top of the second shutter 22 is parallel to the inner lower surface 11j. The top of the first shutter 21 may be tilted with respect to the inner lower surface 11j in the following manner. Specifically, the inner lower surface 11j may be divided into two areas 11e and 11f along the dashed line 11d as shown in FIG. 3A, for example, and may be tilted in that area 11f by the angle θ as shown in FIG. 15.

In such a structure, even if the first shutter 21 rotates, the plane of rotation thereof is tilted by the same angle. Accordingly, as the first shutter 21 rotates, the disc 100 is raised to a higher vertical level for the disc inner edge supporting portion 22d of the second shutter 22. That is to say, the disc 100 goes away from the disc inner edge supporting portion 22d of the second shutter 22 so to speak. For that reason, the disc inner edge supporting portion 22d will not contact with the signal recording area of the disc 100.

Figure 16:
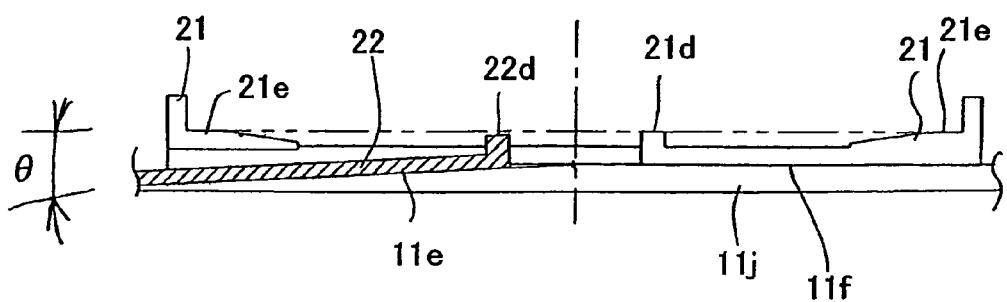
FIG. 16 is a cross-sectional view illustrating another structure of the disc cartridge according to the seventh preferred embodiment.

In the disc cartridge shown in FIG. 15, the first shutter 21 is tilted with respect to the inner lower surface 11j. Alternatively, the second shutter 22 may be tiled instead. Specifically, as shown in FIG. 16, the top of the second shutter 22 may define an angle θ with respect to the inner lower surface 11j while that of the first shutter 21 may be parallel to the inner lower surface 11j. To realize such an arrangement, the area 11e may be tilted by the angle θ as shown in FIG. 16 contrary to the structure shown in FIG. 15.

Eight Embodiment

Hereinafter, a disc cartridge according to an eighth specific preferred embodiment of the present invention will be described with reference to the accompanying drawings.

The disc cartridge of this eighth preferred embodiment also includes a structure that is specially designed to prevent the disc inner edge supporting portion 322d of the second shutter 322 from contacting with the signal recording side 100A of the disc 100.

Figure 17A:
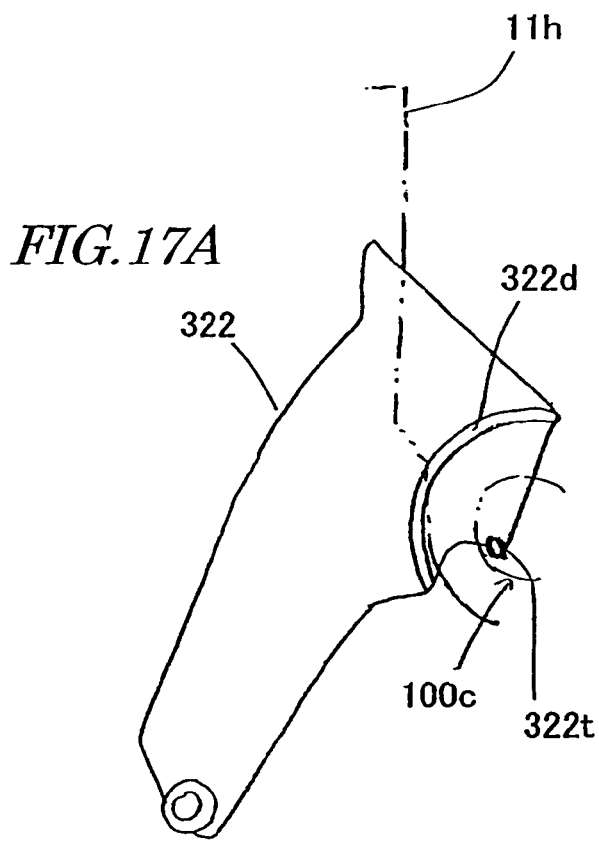
FIG. 17A is a plan view illustrating the structure of the second shutter of a disc cartridge according to an eighth specific preferred embodiment of the present invention.
Figure 17B:
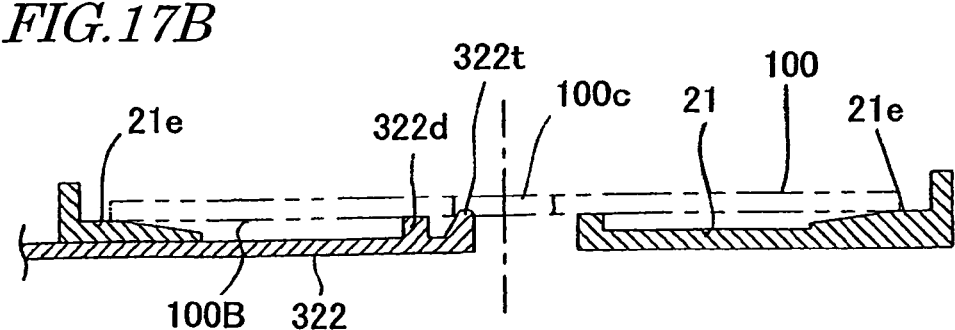
FIGS. 17B and 17C are cross-sectional views illustrating the structure of the disc cartridge according to the eighth specific preferred embodiment of the present invention.

As shown in FIGS. 17A and 17B, the disc cartridge of this preferred embodiment includes a second shutter 322. The second shutter 322 includes a protrusion 322t that protrudes into the center hole 100h of the disc 100 while the first and second shutters 21 and 322 are closed. The top of the protrusion 322t is higher than that of the disc inner edge supporting portion 322d.

Figure 17C:
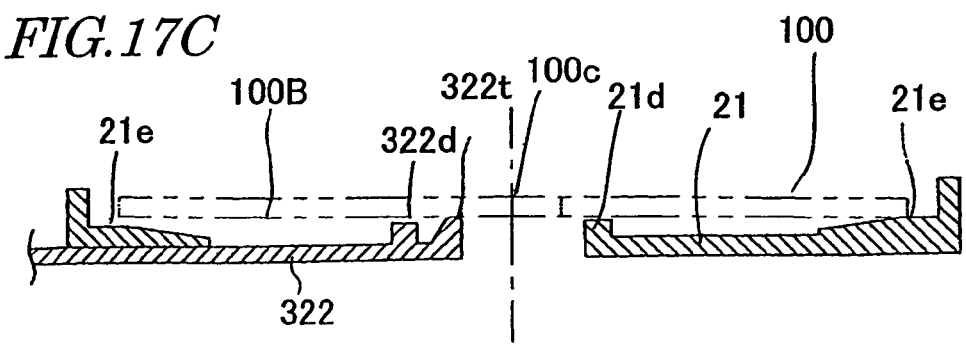

When the first and second shutters 21 and 322 start to be opened, the protrusion 322t lifts the disc 100 as shown in FIG. 17C. As a result, the top of the disc inner edge supporting portion 322d comes out of contact with the disc 100. Thereafter, the second shutter 322 will maintain this state until the second shutter 322 is fully opened. In the meantime, the protrusion 322t moves only under a non-signal recording area of the disc 100 around the center hole 100h thereof and never contacts with the signal recording area thereof. Thus, the disc inner edge supporting portion 322d will not contact with the disc 100 and no damage will be done on the signal recording area of the disc 100.

Ninth Embodiment

Hereinafter, a disc cartridge according to a ninth specific preferred embodiment of the present invention will be described with reference to the accompanying drawings.

The disc cartridge of this ninth preferred embodiment also includes a structure that is specially designed to prevent the disc inner edge supporting portion 22d of the second shutter 22 from contacting with the signal recording side 100A of the disc 100.

Figure 18A:
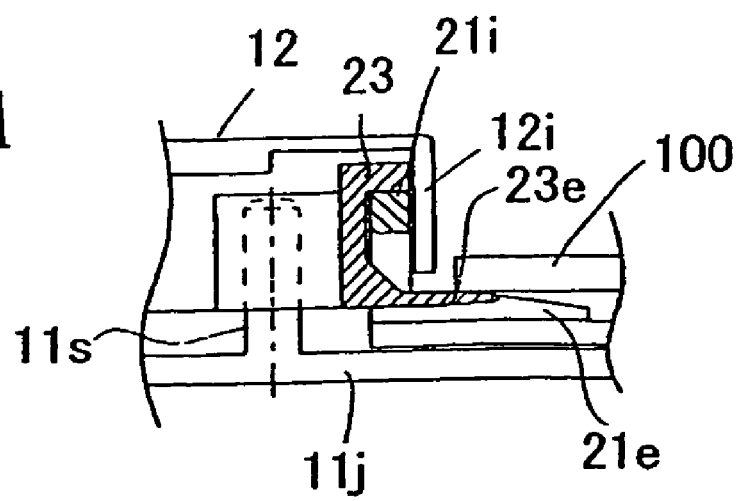
FIGS. 18A, 18B and 18C are cross-sectional views illustrating the structure of the disc supporting member of a disc cartridge according to a ninth specific preferred embodiment of the present invention.

The disc cartridge of this ninth preferred embodiment is different from the disc cartridge 1 of the first preferred embodiment described above in the following respect. Specifically, in the disc cartridge 329, while the first and second shutters 21 and 22 are going to be opened, the disc outer edge supporting portion 23e of the disc supporting member 23 is raised to a vertical level higher than that of the disc outer edge supporting portion 21e of the first shutter 21. FIGS. 18A and 18C illustrate the positions of the disc supporting member 23 when the first and second shutters 21 and 22 of the disc cartridge of this preferred embodiment are closed and opened, respectively. Comparing FIGS. 18A and 18C with FIGS. 7B and 7C, it can be easily seen that when the first and second shutters 21 and 22 are closed or opened, the disc supporting member 23 is located at the same position as that described for the first preferred embodiment.

Figure 18B:
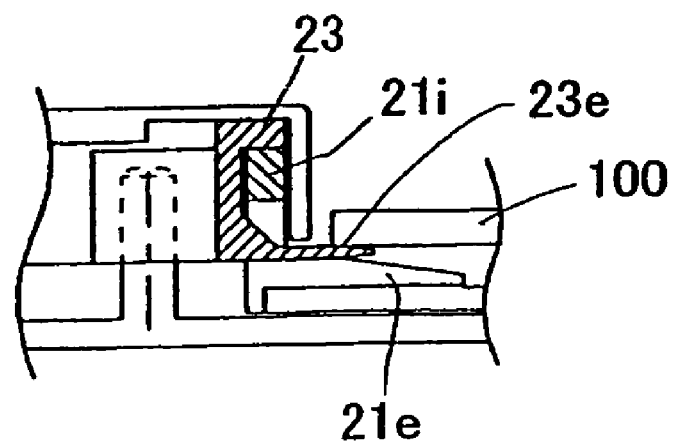
Figure 18C:
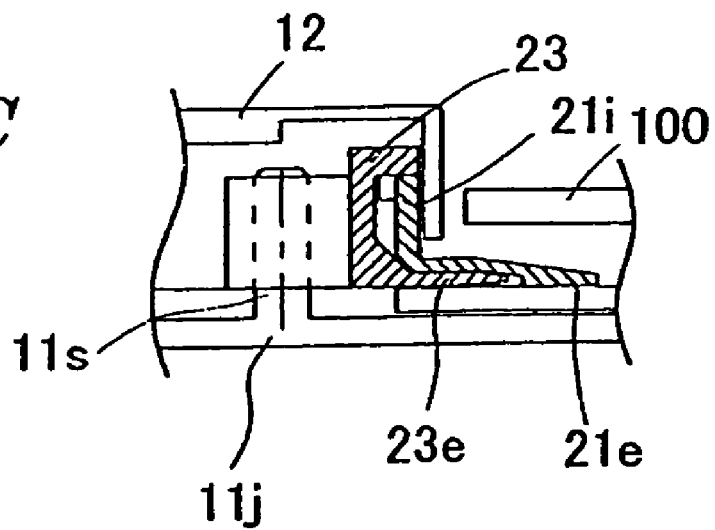

In this preferred embodiment, however, while the first and second shutters 21 and 22 are going to be opened, the disc outer edge supporting portion 23e of the disc supporting member 23 is raised to a vertical level higher than that of the disc outer edge supporting portion 21e of the first shutter 21, thereby getting the disc 100 held by the disc outer edge supporting portion 23e as shown in FIG. 18B. Then, the disc inner edge supporting portion 22d will not contact with the disc 100, and no damage will be done on the signal recording area of the disc 100. To raise the disc supporting member 23 to such a high vertical level as that shown in FIG. 18B, a portion of the sidewall 21i of the first shutter 21, through which the disc supporting member 23 passes while the first and second shutters 21 and 22 are going to be opened, should have its height locally increased so that the disc supporting member 23 moves over the disc outer edge supporting portion 21e.

In the first through nineteenth preferred embodiments described above, the first and second shutters 21 and 22 may has an anti-scratching structure in the area facing the disc 100, depending on the necessity.

Also, in the first through ninth preferred embodiments of the present invention described above, the disc 100 to be stored in the disc cartridge has just one signal recording side 100A. However, a single-sided disc like this is used for illustrative purposes only. This is because the disc cartridge of the present invention has such a structure as to expose one side of the disc stored therein and because a single-sided disc is best suited to the disc cartridge of that type. Thus, even a disc having two signal recording sides (i.e., a double-sided disc) may be appropriately stored in the disc cartridge of the present invention and may be loaded into a disc drive to read or write a signal therefrom/thereon. It should be noted, however, that where a double-sided disc is stored in the disc cartridge of the present invention, dust may be deposited on the exposed one of the two signal recording sides. Accordingly, in that case, some mechanism for preventing the unwanted dust deposition should be provided for the disc cartridge.

Also, in the first through ninth preferred embodiments described above, the size of the disc 100 is not particularly specified. This is because the disc cartridge of the present invention may accommodate a disc having a size of 12 cm or any of various other sizes.

Furthermore, in the first through ninth preferred embodiments described above, the disc cartridge is illustrated as having an outer dimension that is slightly greater than the size of the disc. However, the size relationship between the disc and the disc cartridge is not limited to the illustrated one. For example, even when the disc cartridge has an outer dimension that is large enough to store a 12 cm disc therein, the disc storage portion and the disc holders of the disc cartridge may have their sizes and structures defined in such a manner as to store an 8 cm disc. Such a disc cartridge may be used as an adapter for getting read and write operations performed on an 8 cm disc by a disc drive for a 12 cm disc.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

INDUSTRIAL APPLICABILITY

According to the invention, there is provided a disc cartridge which is excellent in design by exposing a label side of a disc, has a small thickness and includes a shatter that is able to be made of resin or the like. Also, the disc cartridge can hold a disc therein tightly thereby preventing scratches on an information recording region of the disc or preventing dusts from adhering on the information recording region.

What is claimed is:

1. A disc cartridge comprising:
   a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc; and
   first and second shutters provided between the second side of the disc and the bottom of the disc storage portion, wherein the first shutter rotates around the center of the chucking opening; the center of rotation of the second shutter is located outside of the chucking opening; and the first and second shutters expose or cover the head opening cooperatively,
   wherein while closed, the first and second shutters define a continuous center hole that has a diameter approximately equal to that of the chucking opening.

2. A disc cartridge comprising:
   a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc; and
   first and second shutters provided between the second side of the disc and the bottom of the disc storage portion, wherein the first shutter rotates around the center of the chucking opening; the center of rotation of the second shutter is located outside of the chucking opening; and the first and second shutters expose or cover the head opening cooperatively, and wherein each of the first and second shutters includes a first convex portion, the first convex portions contacting with each other to form a continuous ring-like convex portion around the center hole while the first and second shutters are closed.

3. The disc cartridge of claim 2, wherein the first shutter further includes a second convex portion that contacts with an outer edge and its surrounding portion of the second side of the disc.

4. The disc cartridge of claim 3, wherein the top of the first convex portions of the first and second shutters is substantially as high as that of the second convex portion of the first shutter.

5. The disc cartridge of claim 4, wherein while the first and second shutters closed are going to be opened, the top of the second convex portion of the first shutter is locally higher than that of the first convex portion of the second shutter.

6. The disc cartridge of claim 4, wherein the tops of the first and second convex portions of the first shutter are located on the same plane, which is not parallel to the bottom of the disc storage portion.

7. A disc cartridge comprising:
   a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
   first and second shutters provided between the second side of the disc and the bottom of the disc storage portion, wherein the first shutter rotates around the center of the chucking opening; the center of rotation of the second shutter is located outside of the chucking opening; and the first and second shutters expose or cover the head opening cooperatively; and
   first and second disc holders for pressing the disc toward the bottom of the disc storage portion and holding the disc thereon inside the disc storage portion while the first and second shutters are closed,
   wherein each of the first and second disc holders includes a downwardly tapered slope and holds the disc thereon by bringing the slope into contact with the outer edge of the disc.

8. The disc cartridge of claim 7, wherein the first disc holder is provided for the second shutter.

9. A disc cartridge comprising:
   a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;

at least one shutter, which is provided between the second side of the disc and the bottom of the disc storage portion so as to expose or cover the head opening; and a disc supporting member, which contacts with an outer edge and its surrounding portion of the second side of the disc while the head opening is covered with the shutter, wherein the disc supporting member is movable upward and downward with respect to the bottom of the disc storage portion so as to avoid contact with the outer edge and the surrounding portion of the second side of the disc while the shutter is opened.

10. A disc cartridge comprising:

a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked eternally; and the head opening is also formed on the bottom of the disc storage portion so as to allow a head, which reads and/or writes a signal from/on the second side of the disc, to access the second side of the disc;

at least one shutter, which is provided between the second side of the disc and the bottom of the disc storage portion so as to expose or cover the head opening, the shutter including a cylindrical sidewall; and a bottom, which is connected to the cylindrical sidewall; and a disc supporting member, which contacts with an outer edge and its surrounding portion of the second side of the disc while the head opening is covered with the shutter, the disc supporting member being moved up or down by the sidewall.

11. A disc cartridge comprising:

a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;

at least one shutter, which is provided between the second side of the disc and the bottom of the disc storage portion so as to expose or cover the head opening; and a disc supporting member, which contacts with an outer edge and its surrounding portion of the second side of the disc while the head opening is covered with the shutter, wherein while the shutter is opened, the disc supporting member is located between the bottom of the shutter and the bottom of the disc storage portion.

12. A disc cartridge comprising:

a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;

at least one shutter, which is provided between the second side of the disc and the bottom of the disc storage portion so as to expose or cover the head opening; and a disc supporting member, which contacts with an outer edge and its surrounding portion of the second side of the disc while the head opening is covered with the shutter, wherein while the shutter is closed, the disc supporting member is located between the shutter and the disc.

13. A disc cartridge comprising:

a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;

at least one shutter, which is provided between the second side of the disc and the bottom of the disc storage portion so as to expose or cover the head opening; and a disc retaining member, which protrudes into the disc window and which contacts with the first side of the disc so as to press the disc toward the bottom of the disc storage portion in a region that is separated from an outer edge of the disc via a predetermined distance, wherein the disc retaining member protrudes into the disc window so as not to contact with the disc while the shutter is opened.

14. A disc cartridge comprising:

a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;

at least one shutter, which is provided between the second side of the disc and the bottom of the disc storage portion so as to expose or cover the head opening; and a disc retaining member, which protrudes into the disc window and which contacts with the first side of the disc so as to press the disc toward the bottom of the disc storage portion in a region that is separated from an outer edge of the disc via a predetermined distance, wherein the disc retaining member is secured to the cartridge body so as to be rotatable to a position where the disc retaining member does not protrude into the disc window.

15. The disc cartridge of claim 14, further comprising a locking member for use to prevent the disc retaining member from rotating to the position where the disc retaining member does not protrude into the disc window.

16. A disc cartridge comprising:
a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
at least one shutter, which is provided between the second side of the disc and the bottom of the disc storage portion so as to expose or cover the head opening; and
a disc retaining member, which protrudes into the disc window and which contacts with the first side of the disc so as to press the disc toward the bottom of the disc storage portion in a region that is separated from an outer edge of the disc via a predetermined distance, wherein the disc retaining member has first and second regions that contact with the disc.

17. A disc cartridge comprising:
a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
at least one shutter, which is provided between the second side of the disc and the bottom of the disc storage portion so as to expose or cover the head opening; and
a disc retaining member, which protrudes into the disc window and which contacts with the first side of the disc so as to press the disc toward the bottom of the disc storage portion in a region that is separated from an outer edge of the disc via a predetermined distance, wherein the disc retaining member includes rotation stoppers, which are used to prevent the disc from rotating, in the first and second regions.

18. The disc cartridge of claim 17, wherein the rotation stoppers are made of rubber.

19. A disc cartridge comprising:
a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc; and
first and second shutters provided between the second side of the disc and the bottom of the disc storage portion, wherein the first shutter rotates around the center of the chucking opening; the center of rotation of the second shutter is located outside of the chucking opening; and the first and second shutters expose or cover the head opening cooperatively, wherein disc window of the cartridge body exposes the first side of the disc entirely.

20. A disc cartridge comprising:
a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
at least one shutter, which is provided between the second side of the disc and the bottom of the disc storage portion so as to expose or cover the head opening; and
a disc supporting member, which contacts with an outer edge and its surrounding portion of the second side of the disc while the head opening is covered with the shutter, wherein the disc window of the cartridge body exposes the first side of the disc entirely.

21. A disc cartridge comprising:
a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed inside the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
at least one shutter, which is provided between the second side of the disc and the bottom of the disc storage portion so as to expose or cover the head opening; and
a disc retaining member, which protrudes into the disc window and which contacts with the first side of the disc so as to press the disc toward the bottom of the disc storage portion in a region that is separated from an outer edge of the disc via a predetermined distance, wherein the disc window of the cartridge body exposes the first side of the disc entirely.

* * * * *

UNITED STATES PATENT AND TRADEMARK OFFICE
CERTIFICATE OF CORRECTION

PATENT NO. : 7,007,291 B2 Page 1 of 1
APPLICATION NO. : 10/469062
DATED : February 28, 2006
INVENTOR(S) : Yoshito Saji et al.

It is certified that error appears in the above-identified patent and that said Letters Patent is hereby corrected as shown below:

Title Page, Item (73): should read

The assignees are -- Matsushita Electric Industrial Co., Ltd,, Osaka (JP) and Sony Corporation, Tokyo (JP) --.

Signed and Sealed this

Twenty-seventh Day of February, 2007

JON W. DUDAS
*Director of the United States Patent and Trademark Office*